US011855949B2

(12) United States Patent
Shanmugam

(10) Patent No.: US 11,855,949 B2
(45) Date of Patent: Dec. 26, 2023

(54) COMPANION USER ACCOUNTS

(71) Applicant: Yahoo Ad Tech LLC, Wilmington, DE (US)

(72) Inventor: Gnanavel Shanmugam, San Jose, CA (US)

(73) Assignee: Yahoo Ad Tech LLC, New York, NY (US)

( * ) Notice: Subject to any disclaimer, the term of this patent is extended or adjusted under 35 U.S.C. 154(b) by 0 days.

(21) Appl. No.: 17/740,397

(22) Filed: May 10, 2022

(65) Prior Publication Data
US 2023/0370411 A1    Nov. 16, 2023

(51) Int. Cl.
| | | |
|---|---|---|
| *G06F 15/16* | (2006.01) | |
| *H04L 51/42* | (2022.01) | |
| *H04L 51/21* | (2022.01) | |
| *H04L 51/063* | (2022.01) | |
| *H04L 67/306* | (2022.01) | |
| *H04L 51/52* | (2022.01) | |

(52) U.S. Cl.
CPC ............ *H04L 51/42* (2022.05); *H04L 51/063* (2013.01); *H04L 51/21* (2022.05); *H04L 51/52* (2022.05); *H04L 67/306* (2013.01)

(58) Field of Classification Search
CPC ......... H04L 51/42; H04L 51/52; H04L 51/21; H04L 51/063; H04L 67/306
USPC ........................................................ 709/206
See application file for complete search history.

(56) References Cited

U.S. PATENT DOCUMENTS

| | | | | |
|---|---|---|---|---|
| 7,054,906 B2 * | 5/2006 | Levosky | ............... | H04L 51/212 |
| | | | | 709/204 |
| 7,197,539 B1 * | 3/2007 | Cooley | ............... | G06Q 10/107 |
| | | | | 709/206 |
| 7,216,227 B2 * | 5/2007 | Grynberg | ............ | H04L 61/4511 |
| | | | | 713/162 |
| 7,237,010 B2 * | 6/2007 | Mora | .................... | H04L 51/212 |
| | | | | 709/206 |

(Continued)

FOREIGN PATENT DOCUMENTS

WO    WO-2008130877 A1 * 10/2008   ........... H04L 12/585

OTHER PUBLICATIONS

Richer et al., RFC OAuth 2.0 Dynamic Client Registration Protocol, Jul. 2015, IETF, pp. 1-39. (Year: 2015).*

*Primary Examiner* — Alicia Baturay
(74) *Attorney, Agent, or Firm* — Cooper Legal Group LLC

(57) ABSTRACT

In an example, a companion user account is generated without a user specifying a username of the companion user account, wherein the companion user account is different than a primary user account of the user. A first interface, that provides access to resources associated with the primary user account, is displayed via a client application. A second interface, that provides access to resources associated with the companion user account, is displayed via the client application. A content targeting profile associated with the companion user account is generated based upon activity associated with the companion user account and/or one or more interests selected by the user. A subset of content items is selected, from among a plurality of content items and based upon the content targeting profile, for presentation via the second interface associated with the companion user account. A content item of the subset of content items is displayed via the second interface.

20 Claims, 13 Drawing Sheets

(56) References Cited

U.S. PATENT DOCUMENTS

| | | | | |
|---|---|---|---|---|
| 7,305,445 B2* | 12/2007 | Singh | | H04L 51/48 709/224 |
| 7,558,829 B1* | 7/2009 | Perlman | | H04L 51/212 709/206 |
| 7,783,741 B2* | 8/2010 | Hardt | | H04L 51/48 709/224 |
| 7,984,103 B2* | 7/2011 | Feinberg | | H04L 69/08 709/206 |
| 8,140,628 B2* | 3/2012 | Gawor | | G06Q 10/107 709/206 |
| 8,707,400 B2* | 4/2014 | Buss | | G06Q 20/4014 726/5 |
| 8,749,378 B2* | 6/2014 | Srinivasan | | G01S 5/0009 340/505 |
| 8,868,406 B2* | 10/2014 | Tirumalachetty | | G06F 40/258 704/9 |
| 8,949,283 B1* | 2/2015 | Cornwell | | G06F 16/93 709/206 |
| 9,166,961 B1* | 10/2015 | Johansson | | H04L 63/102 |
| 9,521,144 B2* | 12/2016 | Matsugashita | | H04L 63/0884 |
| 9,654,432 B2* | 5/2017 | Cornwell | | G06F 16/93 |
| 9,883,801 B2* | 2/2018 | Stump | | G16H 50/30 |
| 10,083,412 B2* | 9/2018 | Suntinger | | G06Q 10/06314 |
| 10,169,544 B2* | 1/2019 | Breton | | G16Z 99/00 |
| 10,257,299 B2* | 4/2019 | Sadanandan | | H04L 67/55 |
| 10,456,086 B2* | 10/2019 | Breton | | A61M 5/1723 |
| 10,638,981 B2* | 5/2020 | Patek | | A61B 5/14532 |
| 10,728,200 B2* | 7/2020 | Miller | | H04L 51/234 |
| 10,881,334 B2* | 1/2021 | Facchinetti | | A61B 5/14532 |
| 11,063,925 B1* | 7/2021 | Vera | | H04L 9/0643 |
| 11,289,201 B2* | 3/2022 | Breton | | A61B 5/0017 |
| 11,311,665 B2* | 4/2022 | Breton | | G16H 50/20 |
| 11,356,401 B2* | 6/2022 | Shanmugam | | H04L 51/42 |
| 11,438,284 B2* | 9/2022 | Goenka | | H04L 67/52 |
| 11,546,955 B2* | 1/2023 | Kench | | H04W 76/14 |
| 11,567,062 B2* | 1/2023 | Kovatchev | | G16H 40/67 |
| 2003/0105846 A1* | 6/2003 | Zhao | | H04L 67/55 709/219 |
| 2006/0041621 A1* | 2/2006 | Libbey | | H04L 51/48 709/206 |
| 2014/0047043 A1* | 2/2014 | Esfahani | | G06Q 10/107 709/206 |
| 2014/0316927 A1* | 10/2014 | Ganesan | | G06Q 30/0611 705/26.4 |
| 2014/0344273 A1* | 11/2014 | Haines | | G06F 16/35 707/737 |
| 2016/0335572 A1* | 11/2016 | Bennett | | G06Q 10/107 |
| 2019/0379660 A1* | 12/2019 | Thirumavalavan | | H04L 51/046 |
| 2020/0186481 A1* | 6/2020 | Goenka | | H04L 51/04 |
| 2020/0322302 A1* | 10/2020 | Shanmugam | | H04L 51/42 |
| 2021/0000347 A1* | 1/2021 | Stump | | A61B 5/02444 |
| 2021/0064725 A1* | 3/2021 | Miller | | G06F 21/45 |
| 2022/0203029 A1* | 6/2022 | Breton | | A61B 5/4836 |
| 2022/0303240 A1* | 9/2022 | Shanmugam | | H04L 51/48 |
| 2022/0392632 A1* | 12/2022 | Wang | | G16H 50/30 |
| 2022/0417188 A1* | 12/2022 | Goenka | | H04L 67/52 |
| 2022/0417275 A1* | 12/2022 | Jones | | H04L 63/1433 |

* cited by examiner

COMPANION USER ACCOUNTS

BACKGROUND

Many services, such as email services may allow users to create email accounts for sending and receiving emails. For example, a user may use an email account to communicate with friends, family, and/or acquaintances. The user may further use the email account to subscribe to one or more subscription services, etc.

SUMMARY

In accordance with the present disclosure, one or more computing devices and/or methods are provided. In an example, upon installation of an email client application on a client device, a companion email account is generated without a user of the client device specifying an email address of the companion email account, wherein the companion email account is different than a primary email account of the user. A first email interface, that provides access to resources associated with the primary email account, is displayed via the email client application. A second email interface, that provides access to resources associated with the companion email account, is displayed via the email client application. A content targeting profile associated with the companion email account is generated based upon activity associated with the companion email account and/or one or more interests selected by the user. A plurality of content items is received from a plurality of entities. A subset of content items is selected from among the plurality of content items for presentation via the second email interface associated with the companion email account. The subset of content items is selected based upon the content targeting profile. A first content item of the subset of content items is displayed via the second email interface associated with the companion email account.

In an example, upon installation of a client application on a client device, a companion user account is generated without a user of the client device specifying a username of the companion user account, wherein the companion user account is different than a primary user account of the user. A first interface, that provides access to resources associated with the primary user account, is displayed via the client application. A second interface, that provides access to resources associated with the companion user account, is displayed via the client application. A content targeting profile associated with the companion user account is generated based upon activity associated with the companion user account and/or one or more interests selected by the user. A plurality of content items is received from a plurality of entities. A subset of content items is selected from among the plurality of content items for presentation via the second interface associated with the companion user account. The subset of content items is selected based upon the content targeting profile. A first content item of the subset of content items is displayed via the second interface associated with the companion email account.

In an example, a companion email account is generated without a user specifying an email address of the companion email account, wherein the companion email account is different than a primary email account of the user. A first email interface, that provides access to resources associated with the primary email account, is displayed via an email client application. A second email interface, that provides access to resources associated with the companion email account, is displayed via the email client application. A content targeting profile associated with the companion email account is generated based upon activity associated with the companion email account and/or one or more interests selected by the user. A subset of content items is selected from among a plurality of content items for presentation via the second email interface associated with the companion email account. The subset of content items is selected based upon the content targeting profile. A first content item of the subset of content items is displayed via the second email interface associated with the companion email account.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
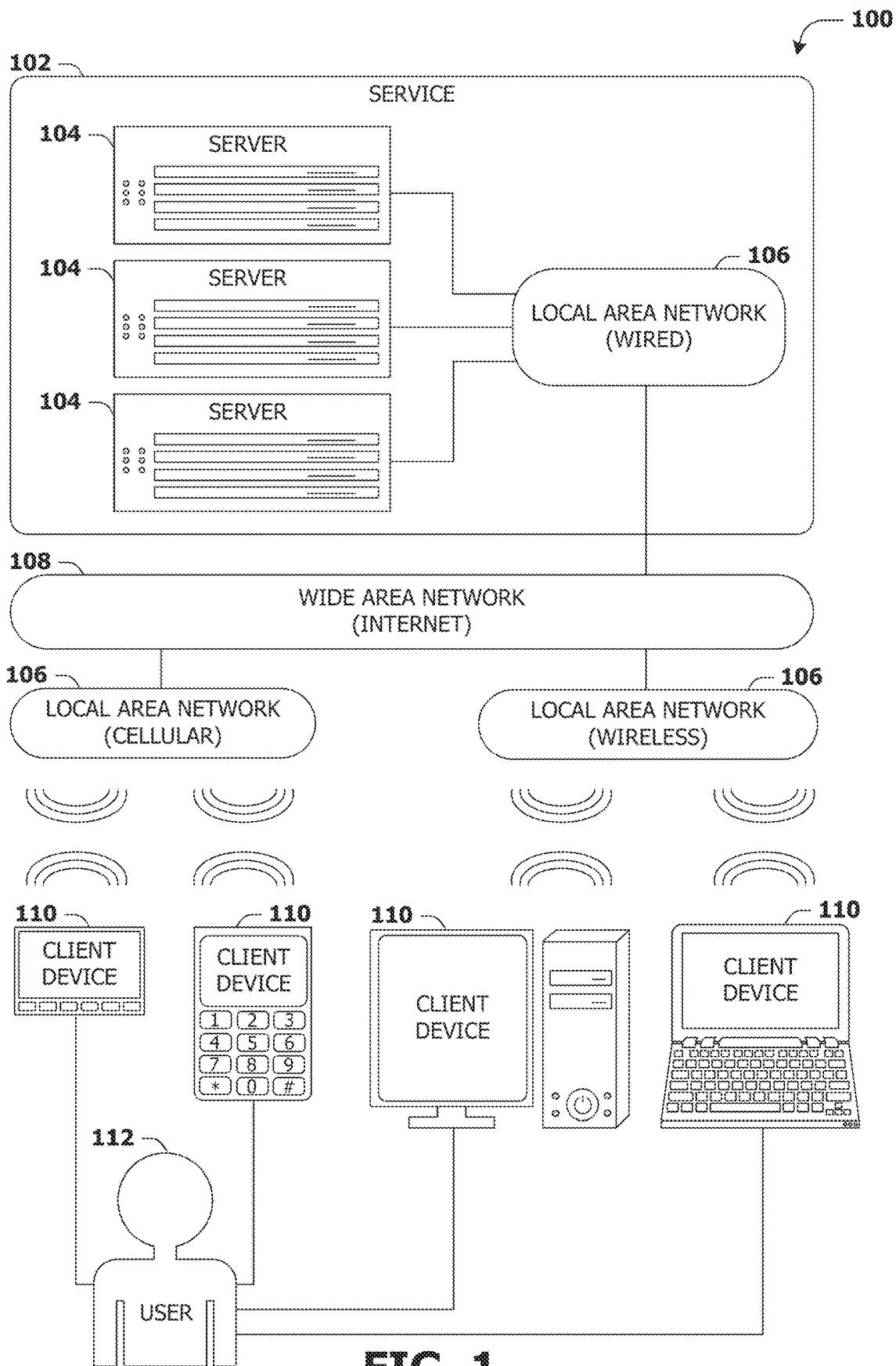
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
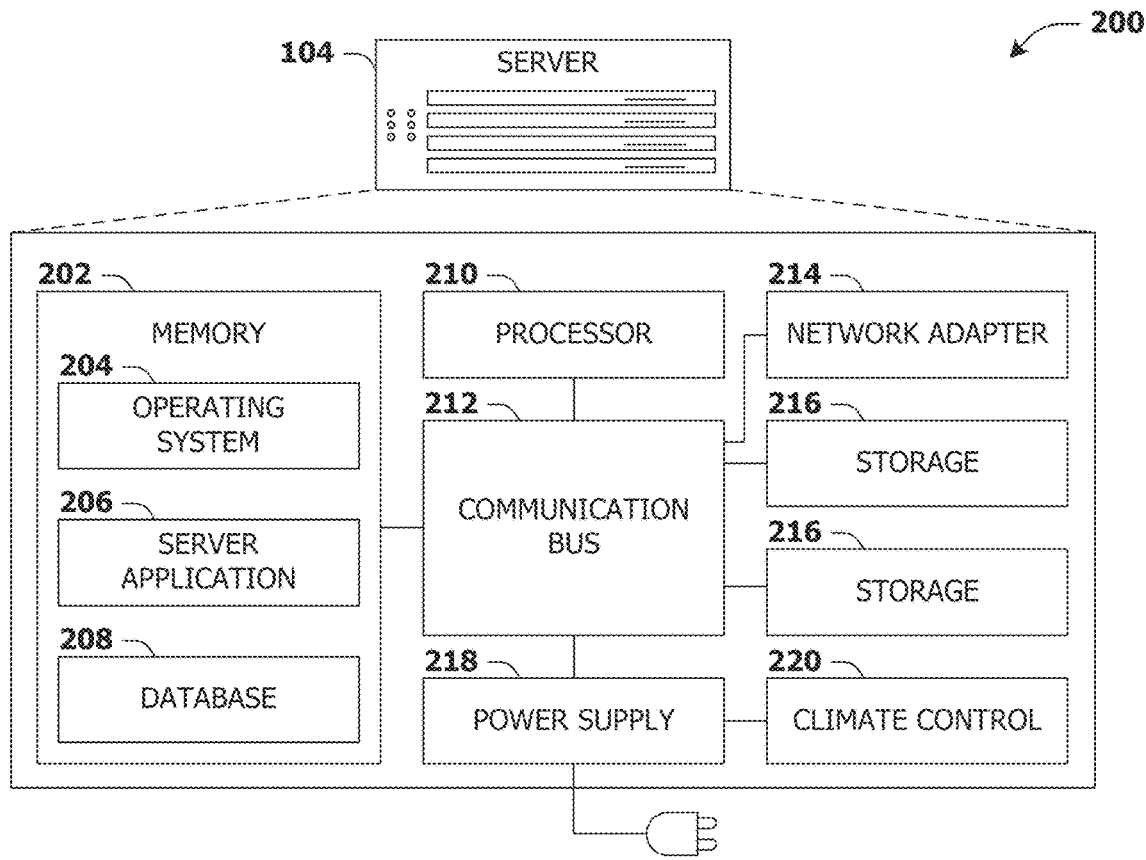
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
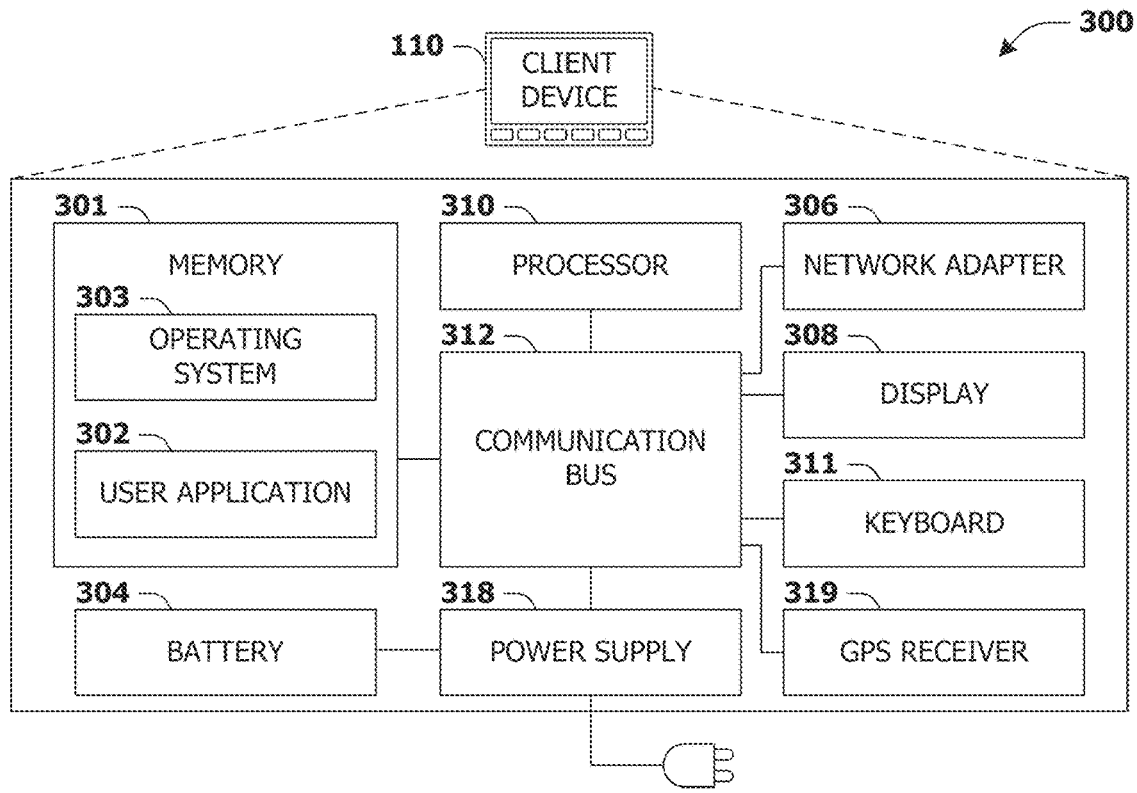
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for generating a companion user account and/or providing content using the companion user account are provided. A user may have a primary email account (e.g., a personal email account) with which the user may communicate with friends, family, colleagues, and/or other acquaintances. Data associated with the primary email account (e.g., the data may comprise emails sent and/or received by the primary email account, searches performed using the primary email account, etc.) may be scanned and/or used to target content (e.g., advertisements) to the user. Accordingly, the user may not have control over privacy of the primary email account (e.g., the user may not have control over whether or not the data associated with the primary email account is to be used to target content to the user and/or the user may not have control over which data associated with the primary email account is to be used to target content to the user). Alternatively and/or additionally, an email interface (configured to provide access to resources of the primary email account) may display one or more content items (e.g., one or more advertisements) targeted to the user in conjunction with displaying resources (e.g., emails and/or email items) of the primary email account, wherein the one or more content items may distract the user from the resources of the email interface and/or may worsen a user experience of the user with the email interface (e.g., it may take longer for the user to complete a task using the email interface due to the user being distracted by the one or more content items).

Thus, in accordance with one or more of the techniques herein, a companion email account to be used for targeting content to the user may be generated. The companion email account is different than the primary email account. The companion email account may be generated upon installation of an email client application on a client device associated with the user. The companion email account may be generated without the user specifying an email address of the companion email account. In some examples, data associated with the companion email account (e.g., the data may comprise emails sent and/or received by the companion email account, searches performed using the companion email account, etc.) may be scanned and/or used to target content (e.g., advertisements) to the user. Alternatively and/or additionally, user-selected data (e.g., data that the user selects and/or consents to being used for purposes of targeting content to the user) may be used to target content (e.g., advertisements) to the user. In an example, the user-selected data may be indicative of one or more interests selected by the user. Alternatively and/or additionally, the user-selected data may comprise a set of user-selected data (e.g., activity data), associated with the primary user account, selected by the user. In some examples, the user may select an option that no personal data of the primary user account be used for targeting content to the user. Accordingly, the user may have more control over personal data (e.g., data of the primary user account) that is used for targeting content to the user.

In some examples, the email client application may display a first email interface that provides access to resources associated with the primary email account. The email client application may display a second email interface that provides access to resources associated with the companion email account. In some examples, selected content (e.g., content items, such as advertisements, that are targeted to the user) may be displayed via the second email interface (associated with the companion email account) rather than the first email interface associated with the primary email account. Accordingly, the selected content may not be displayed via the first email interface (e.g., the selected content may not be displayed while resources of the primary email account are provided to the user), and thus, resources of the primary email account may be provided to the user in a distraction-free environment (e.g., the first email interface).

Figure 4:
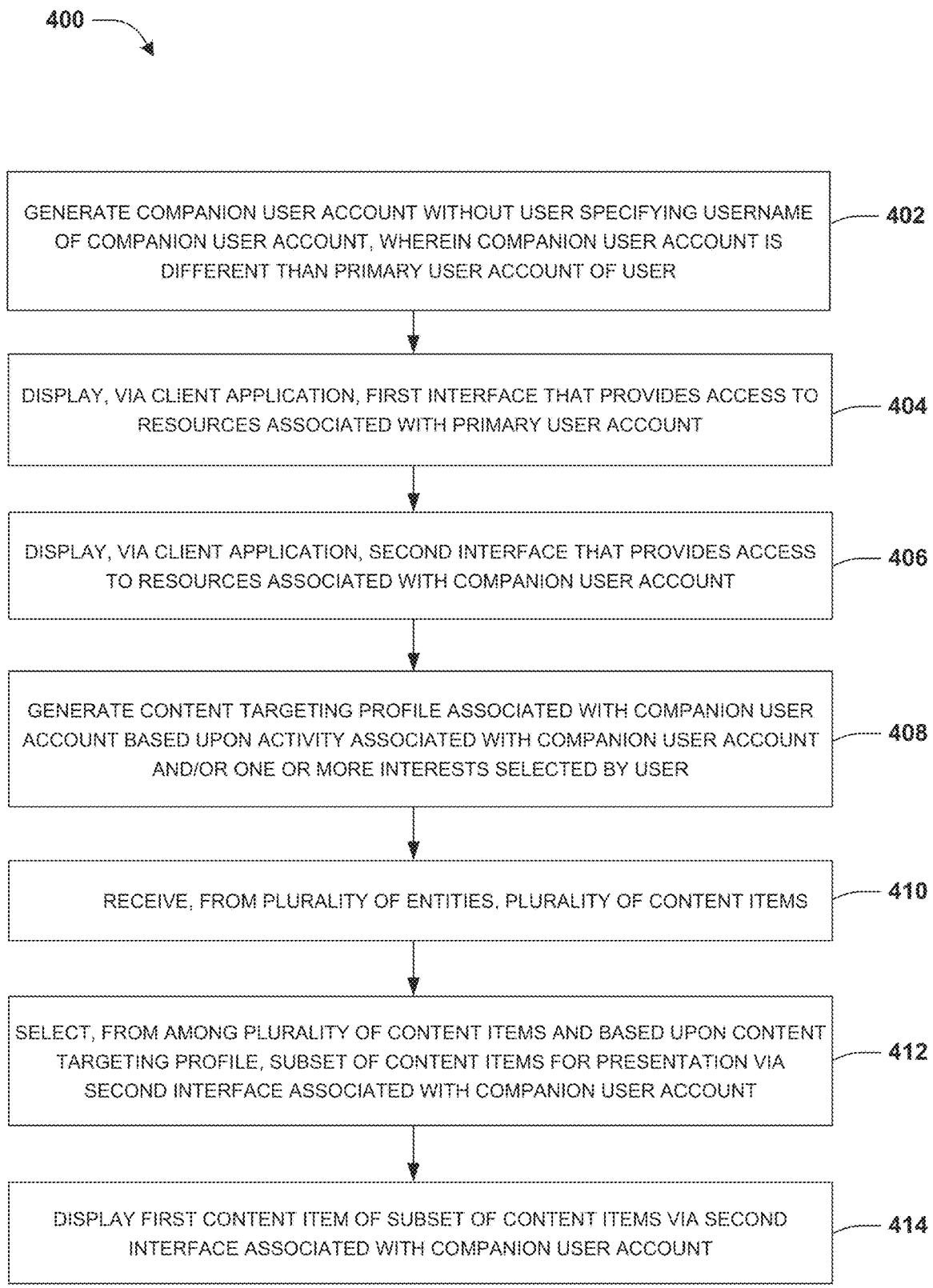
FIG. 4 is a flow chart illustrating an example method for generating a companion user account and/or providing content using the companion user account.

An embodiment of generating a companion user account and/or providing content using the companion user account is illustrated by an example method 400 of FIG. 4, and is further described in conjunction with system 501 of FIGS. 5A-5I.

At 402, a first companion user account is generated. The first companion user account may be generated without a first user specifying a username of the first companion user account. The first companion user account is different than a first primary user account of the first user. In an example, the first companion user account and/or the first primary user account may be user accounts for a service (e.g., an email service, a social media platform, a content service, etc.) provided via a first client application (e.g., at least one of a mobile application, a web application, etc.) installed on a first client device associated with the first user.

In some examples, the first client application may comprise an email client application, such as an application that provides one or more email services of an email service provider. Alternatively and/or additionally, the first client application may comprise an application different than an email client application, such as at least one of a social media application (e.g., an application for at least one of posting social media posts, viewing other users' social media posts, messaging with other users, etc.), a messaging application (e.g., an application for at least one of messaging with other users, audio calling with other users, video calling with other users, etc.), a content application (e.g., an application for consuming at least one of videos, audio, news articles, blogs, etc.), etc. In some examples, the first client application may provide one or more services (e.g., email services, social media services, messaging services, content services, etc.) of a communication system.

The first primary user account may correspond to a personal account of the first user. The first companion user account may be generated without user intervention (of the first user) and/or may be used by the communication system for at least one of targeting and/or showing content to the first user, subscribing the first user to one or more subscription services, etc. In some examples, the first companion user account may be owned by an entity corresponding to the communication system, and thus, the communication system may unilaterally control and/or deactivate the first companion user account (without the first user's consent, for example). In some examples, the first user is also given control to deactivate the first companion user account. For example, the first companion user account may be deactivated in response to receiving, via the first client application, a request to deactivate the first companion user account. In some examples, the request to deactivate the first companion user account may be received in response to a selection (by the first user, for example) of a selectable input of the first client application.

In some examples, information of the first primary user account may be accessed and/or used by the communication system (e.g., for use in targeting content to the first user and/or providing one or more other services) in accordance with one or more regulatory settings associated with one or more regulations (e.g., at least one of General Data Protection Regulation (GDPR), opt-out communications, EU Electronic Communications Code (EECC), etc.). However, at least some of the one or more regulatory settings and/or at least some of the one or more regulations may not be implemented for and/or applicable to the first companion user account (e.g., since the first companion user account may be owned by an entity corresponding to the communication system). Alternatively and/or additionally, one or more settings (e.g., one or more regulatory settings) associated with the one or more regulations may be adjusted (e.g., adjusted by the entity corresponding to the communication system) to allow for scanning data of the first companion user account (e.g., the data may comprise activity data, such as messages and/or emails sent by the first companion user account, messages and/or emails received by the first companion user account, messages and/or emails received by the first companion user account, social media posts posted by the first companion user account, social media posts viewed by the first companion user account, etc.) and/or to allow for using the data to target content (e.g., advertisements) to the first client device.

In some examples, the first companion user account is generated upon installation of the first client application on the first client device. For example, the first companion user account may be generated (e.g., automatically generated) during or after (e.g., immediately upon completion of) installation of the first client application. Alternatively and/or additionally, the first companion user account may be generated in response to receiving an indication that the first user accepts one or more conditions associated with the companion email account. The indication may be received from the first client device (e.g., the first client device on which the first client application is installed).

Figure 5A:
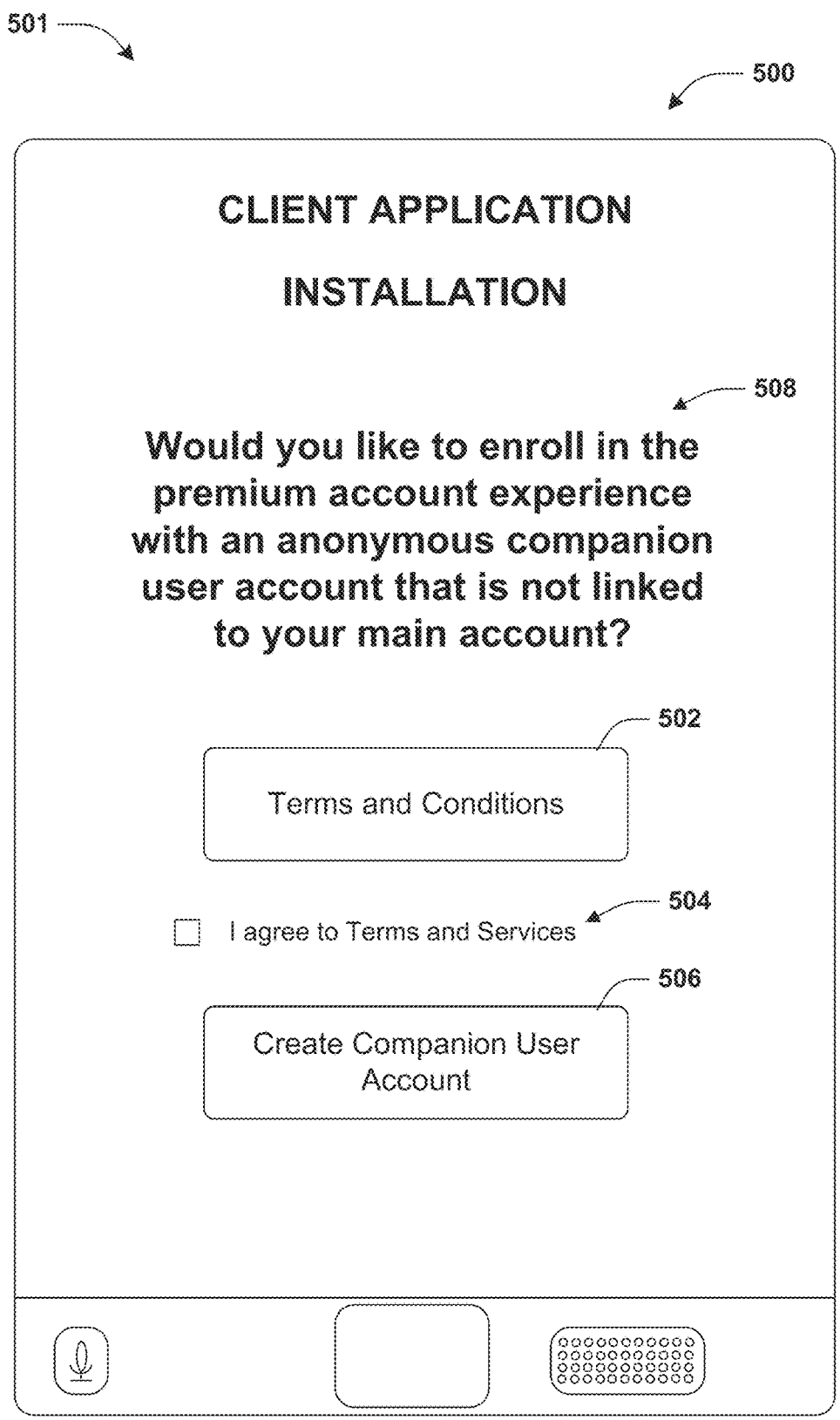
FIG. 5A is a component block diagram illustrating an example system for generating a companion user account and/or providing content using the companion user account, where a client application installation interface is displayed via a first client device.

FIG. 5A illustrates a client application installation interface (e.g., used for installing the first client application) being displayed via the first client device (shown with reference number 500). In an example, the client application installation interface may be displayed during installation of the first client application. The client application installation interface may display an indication that the first user can enroll in a premium account experience with a companion user account (e.g., an anonymous companion user account) that is not linked to the first user's main account (e.g., the first primary user account of the first user). Enrolling in the premium account experience may correspond to changing a service status of the first primary user account (and/or the first client application) from a first status (e.g., a non-premium service status) to a second status (e.g., a premium service status).

In some examples, the first status may be associated with a first set of services and the second status may be associated with a second set of services different than the first set of services. For example, the first set of services may be provided for the first primary user account when the service status of the first primary email account is the first status. Alternatively and/or additionally, the second set of services may be provided for the first primary user account when the service status of the first primary email account is the second status. In an example, the second set of services comprises one or more content categorization services that are not included in the first set of services. In an example where the first client application is an email client application, the one or more content categorization services may comprise one or more email categorization services. In an example, the second set of services comprises one or more notification control services that are not included in the first set of services (e.g., the one or more notification control services may enable the first user to choose and/or customize notification settings for events associated with the first primary user account).

Alternatively and/or additionally, the first status may be associated with a first targeting configuration and the second status may be associated with a second targeting configuration. For example, content may be targeted to the first user and/or the first client device 500 (by the communication system, for example) according to the first targeting configuration when the service status of the first primary email account is the first status. Alternatively and/or additionally, content may be targeted to the first user and/or the first client device 500 (by the communication system, for example) according to the second targeting configuration when the service status of the first primary email account is the second status.

In some examples, the first targeting configuration is associated with using data (e.g., activity data, such as messages and/or emails sent by the first primary user account, messages and/or emails received by the first primary user account, messages and/or emails received by the first primary user account, social media posts posted by the first primary user account, social media posts viewed by the first primary user account, etc.) of the first primary user account to determine interests of the first user and/or to select content to be presented (to the first user, for example) on the first client device 500. Alternatively and/or additionally, the first targeting configuration may be associated with displaying selected content (e.g., advertisements and/or other content) via an interface, of the first client application, that provides resources of the first primary user account (e.g., the interface may correspond to the first interface 522 discussed below). Thus, if the first targeting configuration is used to target content to the first user, while the first user is interacting with the resources of the first primary user account (e.g., the resources may comprise messages and/or emails accessible to the first primary user account), the first user may be shown content items (e.g., targeted to the first user) that can be distracting to the first user (e.g., the content items may distract the first user from the resources of the first primary user account). Alternatively and/or additionally, if the first targeting configuration is used to target content to the first user, personal user data (e.g., activity data) of the first primary user account may be used to determine interests of the first user.

In some examples, the second targeting configuration is associated with using data (e.g., activity data, such as messages and/or emails sent by the first companion user account, messages and/or emails received by the first companion user account, messages and/or emails received by the first companion user account, social media posts posted by the first companion user account, social media posts viewed by the first companion user account, etc.) of the first companion user account to determine interests of the first user and/or to select content to be presented (to the first user, for example) on the first client device 500. Alternatively and/or additionally, the second targeting configuration may be associated with using user-selected data (e.g., data that the first user selects and/or consents to being used for purposes of targeting content to the first user) to determine interests of the first user and/or to select content to be presented (to the first user, for example) on the first client device 500. In an example, the user-selected data may be indicative of one or more interests selected by the first user (e.g., the one or more interests may be selected via an interest selection interface displayed via the first client application, such as where the interest selection interface comprises one or more text-fields into which keywords corresponding to the one or more interests are typed, and/or where the interest selection interface comprises selectable inputs, associated with a plurality of interests, that are used to select the one or more interests). Alternatively and/or additionally, the user-selected data may comprise a set of user-selected data (e.g., activity data), associated with the first primary user account, selected by the first user. For example, the set of user-selected data may be selected via a selection of one or more types of data, associated with the first primary user account, that the first user consents to being used by the communication system for targeting content to the first user. That is, the set of user-selected data may comprise data, associated with the first primary user account, that is determined to correspond to a type of data of the one or more types of data (e.g., data associated with the first primary user account may be included in the set of user-selected data based upon a determination that the data corresponds to a type of data of the one or more types of data). In an example, the one or more types of data may be selected via an interface displayed via the first client application. In an example in which the first client application is an email client application, the one or more types of data (selected by the first user) may comprise at least one of received emails (e.g., if the one or more types of data comprise received emails, the set of user-selected data may comprise emails received by the first primary user account), sent emails (e.g., if the one or more types of data comprise received emails, the set of user-selected data may comprise emails sent by the first primary user account), subscription emails (e.g., if the one or more types of data comprise received emails, the set of user-selected data may comprise emails received by the first primary user account as part of one or more subscription services), emails corresponding to a category of emails (e.g., personal emails, marketing emails, social media emails, etc.), etc. In some examples, if the second targeting configuration is used to target content to the first user, activity data (of the first primary user account) other than the set of user-selected data may not be used for targeting content to the first user. For example, data of the first primary user account (e.g., personal user data, of the first primary user account, comprising one or more received emails, one or more sent emails, etc.) that does not correspond to a type of data of the one or more types of data (selected by the first user) may not be used to determine interests of the first user and/or to select content to be presented (to the first user, for example) on the first client device 500. In some examples, the first user may select (via the first client application, for example) an option that no data (e.g., no personal data) associated with the first primary user account be used for targeting content to the first user. Accordingly, the first user may have more control over personal data (e.g., data of the first primary user account) that is used for targeting content to the first user when the service status of the first primary user account is the second status as compared to when the service status of the first primary user account is the first status (e.g., the first user has more control over a level of privacy of the first primary user account when the service status of the first primary user account is the second status as compared to when the service status of the first primary user account is the first status).

Alternatively and/or additionally, the second targeting configuration may be associated with displaying selected content (e.g., advertisements and/or other content that are targeted to the first user) via an interface, of the first client application, that provides resources of the first companion user account (rather than the first primary user account, for example), such as where the interface is the second interface 528 (discussed below). For example, if the service status is the first status, then the selected content may be displayed via the first interface 522 (discussed below) associated with the first primary user account, whereas if the service status is the second status, then the selected content may be displayed via the second interface 528 (discussed below) associated with the first companion user account. Accordingly, due to enrollment in the premium user experience and/or due to use of the second targeting configuration, the selected content (that would otherwise be displayed on the first interface 522 if the first targeting configuration was being used, thereby distracting the first user from resources of the first primary user account) may not be displayed in the first interface 522 and may instead be displayed in the second interface 528 (that can be accessed at the first user's convenience, for example). In an example, if the second targeting configuration is used to target content to the first user, while the first user is interacting with an interface (e.g., the first interface 522 discussed below) displaying resources of the first primary user account, the first user may not be shown advertisements (that can distract the first user while the first user is trying to use resources of the first primary user account, for example) that may otherwise be shown if the first targeting configuration were being used to target content to the first user. Accordingly, if the second targeting configuration is used to target content to the first user, the first user may be able to access and/or interact with resources of the first primary user account (e.g., via the first interface 522 discussed below) without advertisements distracting the first user.

In some examples, the service status of the first primary user account (and/or the first client application) may be changed from the first status (e.g., the non-premium service status) to the second status (e.g., the premium service status) in association with generating the first companion user account. For example, the service status of the first primary user account (and/or the first client application) may be changed from the first status to the second status in response to generating the first companion user account. Alternatively and/or additionally, the first companion user account may be generated in response to changing the service status of the first primary user account (and/or the first client application) from the first status to the second status.

In some examples, the first companion user account may be generated (and/or the service status of the first primary user account may be changed from the first status to the second status) in response to receiving an indication that the first user accepts one or more conditions associated with the first companion user account and/or the second status. In some examples, information indicative of the one or more conditions may be displayed on the first client device 500 in response to a selection of a terms and conditions selectable input 502 (shown in FIG. 5A). An agreement selectable input 504 may be checked (by selecting the agreement selectable input 504) to indicate that the first user accepts the one or more conditions. The indication that the first user accepts the one or more conditions may be received in response to a selection of a selectable input 506. For example, the indication that the first user accepts the one or more conditions may be received in response to the selection of the selectable input 506 if the agreement selectable input 504 is checked when the selectable input 506 is selected.

In some examples, the first companion user account may be generated using Dynamic Client Registration (DCR) protocol (e.g., Open Authorization (OAuth) 2.0 DCR). In an example, a first identifier of the first client application may be generated using the DCR protocol. The first identifier may identify a first instance of the first client application installed on the first client device 500. In some examples, instances of the first client application installed on different devices may have different identifiers (that are generated using the DCR protocol, for example). The first identifier may be unique among the different identifiers associated with the different instances (e.g., all instances) of the first client application such that the first identifier can be used to identify the first instance of the first client application (installed on the first client device 500) across application installations (e.g., all application installations) of the first client application. In some examples, information associated with the first companion user account (e.g., information indicative of at least one of emails, messages, social media posts, search activity, etc. associated with the first companion user account) may be stored in a server and/or an indication that the information is associated with the identifier may be stored in the server. In some examples, the DCR protocol may define one or more mechanisms for dynamically registering clients (e.g., OAuth 2.0 clients) with authorization servers. Registration requests may send a set of desired client metadata values to an authorization server. A registration may be performed in response to a registration request, wherein the registration may return a client identifier (e.g., the first identifier) to use at the authorization server and/or client metadata values registered for the client. The client may use the registration information to communicate with the authorization server using OAuth 2.0 protocol. The DCR protocol may define a set of client metadata fields and/or values for clients to use during registration. The first companion user account may be generated based upon the first identifier. For example, the first companion user account may be linked to the first identifier. Alternatively and/or additionally, the username of the first companion user account may be generated based upon the first identifier (e.g., the username may comprise the first identifier). In an example in which the first identifier is "ABD1090", the username of the first companion user account may be generated to be "ABD1090". Alternatively and/or additionally, in an example in which the first companion user account is an email account (and the username is an email address), the username of the first companion user account may be generated to be "ABD1090@ EXAMPLEEMAIL. COM" (e.g., "EXAMPLEEMAIL.COM" corresponds to a domain name of the email service provider). Alternatively and/or additionally, the username of the first companion user account may not be generated based upon the first identifier (e.g., the companion user account may be generated based upon information different than the first identifier, and/or may be generated randomly, such as in a pseudo-random and/or truly random manner). In some examples, account information of the first companion user account may be generated based upon the first identifier. For example, the account information may comprise at least one of a name of a user of the first companion user account, a birthday of a user of the first companion user account, etc., where the name may be generated based upon the first identifier (e.g., the name may comprise the first identifier). The account information of the first companion user account may correspond to publically available information of the first companion user account. The account information of the first companion user account may not be generated to include an actual name, an actual birthday, etc. of the first user (and/or the account information of the first companion user account may not be generated based upon account information of the first primary user account) such that the first companion user account is an anonymous account and/or such that the actual name, the actual birthday, etc. of the first user cannot be obtained from merely the username and/or the account information of the first companion user account (e.g., an entity that has access to the username and/or the account information of the first companion user account may not be able to identify the first user of the first client application associated with the first companion user account).

In an example, the first client application comprises a first email client application that provides one or more email services of the communication system (e.g., the email service provider). The first companion user account may comprise a first companion email account and/or the username of the first companion user account may comprise an email address of the first companion email account. The first primary user account may comprise a first primary email account of the first user, such as a personal email account of the first user.

At 404, a first interface that provides access to first resources associated with the first primary user account may be displayed via the first client application. At 406, a second interface that provides access to second resources associated with the first companion user account may be displayed via the first client application.

In some examples, the first interface and the second interface may be displayed separately (by the first client application, for example). For example, the first interface may be displayed via the first client application when the second interface is not displayed via the first client application. Alternatively and/or additionally, the second interface may be displayed via the first client application when the first interface is not displayed via the first client application.

In some examples, the first resources associated with the first primary user account and the second resources associated with the first companion user account may be displayed separately by the first client application. For example, the first resources associated with the first primary user account may be provided via the first client application (e.g., via the first interface) when the second resources are not provided via the first client application. Alternatively and/or additionally, the second resources associated with the first companion user account may be provided via the first client application (e.g., via the second interface) when the first resources are not provided via the first client application.

Figure 5B:
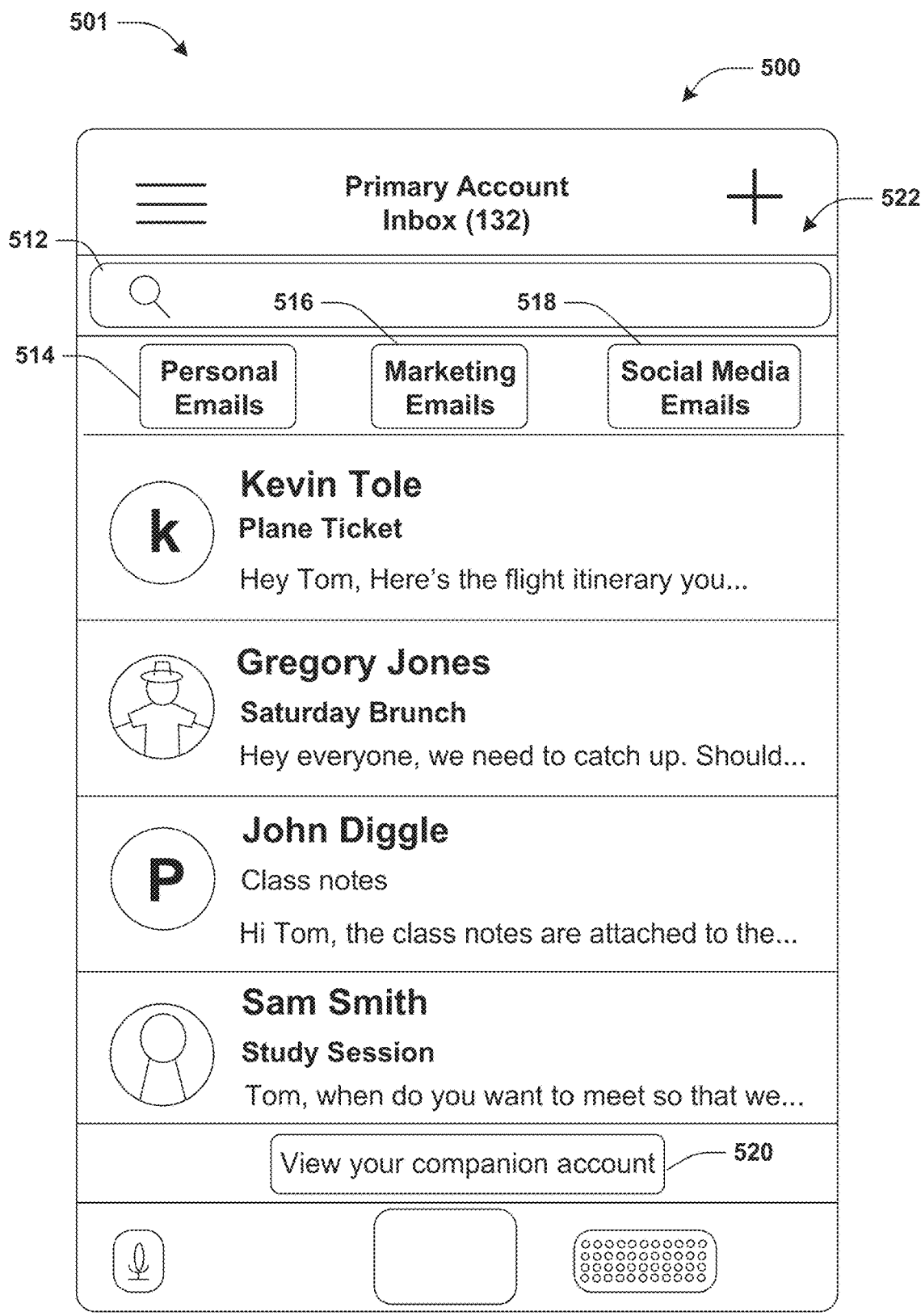
FIG. 5B is a component block diagram illustrating an example system for generating a companion user account and/or providing content using the companion user account, where a client application displays a first interface associated with a primary user account of a user.

FIG. 5B illustrates the first interface (shown with reference number 522) being displayed via the first client application. In the example shown in FIG. 5B, the first client application comprises the first email client application, the first companion user account comprises the first companion email account, the first interface 522 comprises a first email interface and/or the first primary user account comprises the first primary email account of the first user. In an example, the first resources associated with the first primary user account (e.g., resources to which access is provide via the first interface 522 associated with the first primary user account) may comprise at least one of emails received by the first primary user account, emails sent by the first primary user account, email drafts, etc. In some examples, the first resources may not comprise emails sent and/or received by the first companion user account. In an example, the first interface 522 may comprise a list of email items corresponding to emails sent and/or received by the first primary user account (e.g., emails in a mailbox of the first primary user account). In response to a selection of an email item of the list of email items, an email corresponding to the email item may be opened (e.g., displayed) via the first interface 522.

In some examples, the second set of services comprises the one or more content categorization services (e.g., email categorization services), wherein providing the one or more content categorization services affects (e.g., improves) the first interface 522. In some examples, providing the one or more content categorization services may comprise determining categories of content items (e.g., emails, messages, videos, audios, etc.) of the first primary user account, grouping content items into multiple groups of content items based upon the determined categories, and/or providing access to the multiple groups of content items in separate lists.

In an example, the one or more content categorization services may comprise analyzing an email (addressed to the first primary email account of the first user, for example) to determine a category of the email, and/or including the email in a group of emails associated with the category. In an example, a first email and a second email, that are addressed to the first primary email account, may be received. The first email may be analyzed to determine that a category of the first email is a first category (e.g., "personal email", such as an email that is received from a friend, family member, etc. of the first user). Based upon the determination that the category of the first email is the first category, the first email may be included in a first group of emails associated with the first category (e.g., a group of personal emails). The second email may be analyzed to determine that a category of the second email is a second category (e.g., "marketing email", such as an email that comprises content promoting a company, a brand, etc.). Based upon the determination that the category of the second email is the second category, the second email may be included in a second group of emails associated with the second category (e.g., a group of marketing emails). The first interface 522 (e.g., a first email interface) may display email items associated with the first group of emails separately from displaying email items associated with the second group of emails. For example, the first interface 522 may comprise a selectable input 514 associated with the first group of emails (e.g., personal emails) associated with the first category, a selectable input 516 associated with the second group of emails (e.g., marketing emails) associated with the second category and/or a selectable input 518 associated with a third group of emails associated with the third category (e.g., the third category may be "social media email" and/or the third group of emails may comprise emails that are received from social media systems). In response to a selection of the selectable input 514, a list of email items associated with emails of the first group of emails may be displayed via the first interface 522, wherein an email of the first group of emails may be accessed via a selection of an email item, of the list of email items, associated with the email. In response to a selection of the selectable input 516, a list of email items associated with emails of the second group of emails may be displayed via the first interface 522, wherein an email of the second group of emails may be accessed via a selection of an email item, of the list of email items, associated with the email. In response to a selection of the selectable input 518, a list of email items associated with emails of the third group of emails may be displayed via the first interface 522, wherein an email of the third group of emails may be accessed via a selection of an email item, of the list of email items, associated with the email.

It may be appreciated that providing the one or more content categorization services may lead to benefits including, but not limited to, a reduction in screen space and/or an improved usability of a display (e.g., of the first client device 500) (e.g., as a result of automatically determining categories of emails and grouping the emails based upon the categories, where emails belonging to a certain category may be viewed together without the first user being distracted by other emails belonging to other categories, etc.). For example, by displaying a group of emails associated with a desired category, the first user may choose to view the group of emails associated with the desired category without having to scroll though undesired emails associated with undesired categories.

In some examples, the first interface 522 may comprise a first search field 512. A search query may be entered into the first search field 512. In some examples, the communication system (e.g., the email service provider) may comprise a search system configured to generate search results based upon the search query entered into the first search field 512. The search results may be generated based upon at least one of emails, messages, social media posts, content items, etc. that are accessible to the first primary user account. For example, data of the first primary user account may be analyzed to identify emails, messages, social media posts and/or content items that are relevant to the search query, wherein the search results may be generated to comprise links to the emails, the messages, the social media posts and/or the content items (that are determined to be relevant to the search query). In some examples, based upon the search query being received via the first search field 512 of the first interface 522 associated with the first primary user account, the search results may not be generated based upon emails, messages, social media posts and/or content items of the first companion user account (e.g., merely emails, messages, social media posts and/or content items of the first primary user account may be analyzed to generate the search results since the search query was received via the first interface 522 associated with the first primary user account).

In some examples, the first client application may display a selectable input 520 associated with displaying the second interface associated with the first companion user account. For example, in response to a selection of the selectable input 520, the second interface associated with the first companion user account may be displayed. In some examples, the selectable input 520 may display an alert indicator (e.g., a red dot or other graphical object) to alert the first user of one or more events, such as delivery of one or more new (and/or unread) messages (e.g., new and/or unread emails) to the first companion user account that can be accessed with the second interface. Alternatively and/or additionally, the alert indicator may be displayed based upon a determination that the one or more events (and/or the one or more new and/or unread messages) meet a condition (e.g., a condition that the one or more new and/or unread messages are from a certain entity, a condition that the one or more new and/or unread messages comprise a certain type of content, etc.).

Figure 5C:
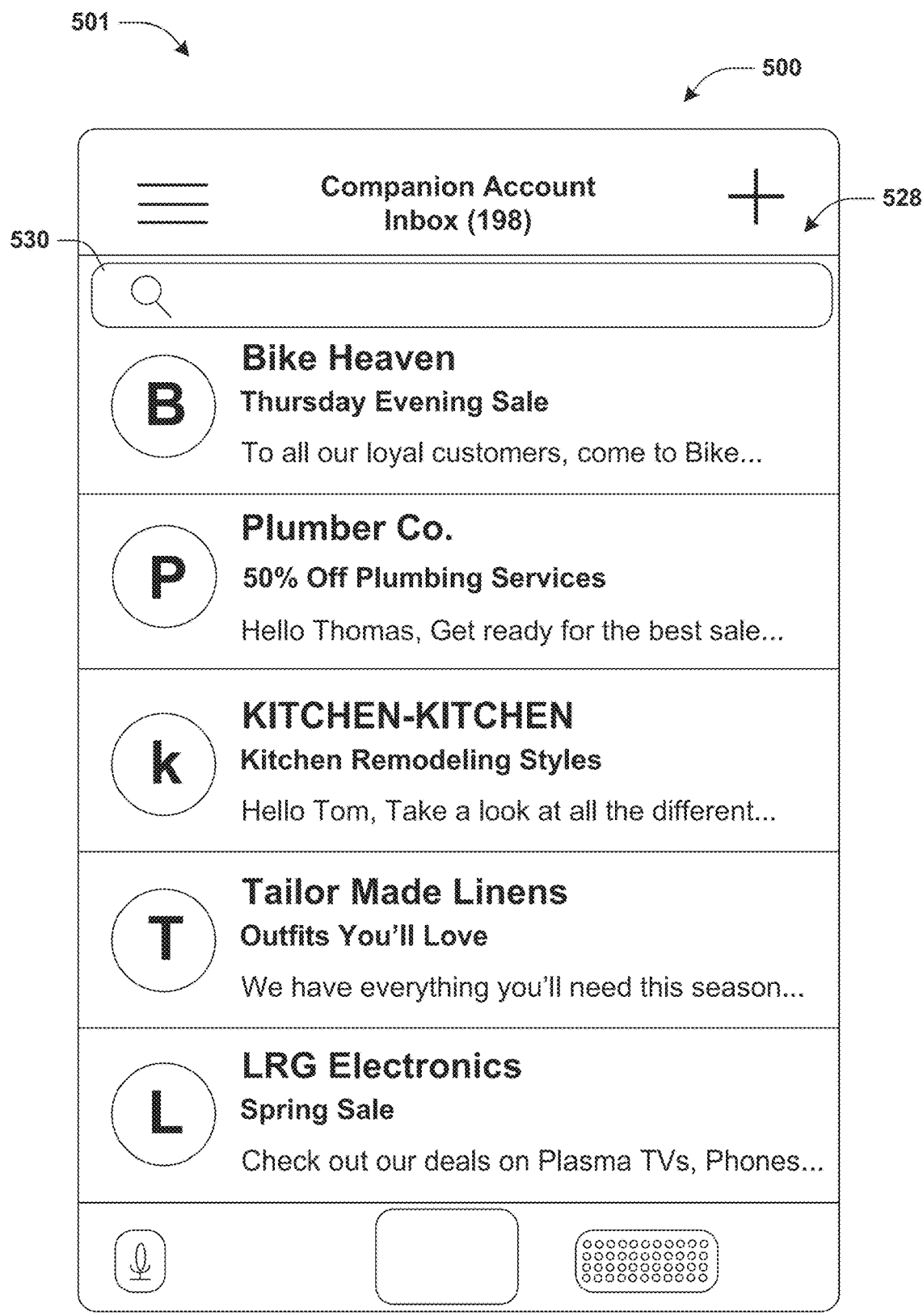
FIG. 5C is a component block diagram illustrating an example system for generating a companion user account and/or providing content using the companion user account, where a client application displays a second interface associated with a companion user account of a user.

FIG. 5C illustrates the second interface (shown with reference number 528) being displayed via the first client application. In the example shown in FIG. 5C, the first client application comprises the first email client application, the first companion user account comprises the first companion email account, the second interface 528 comprises a second email interface and/or the first primary user account comprises the first primary email account of the first user. In an example, the second resources associated with the first companion user account (e.g., resources to which access is provide via the second interface 528 associated with the first companion user account) may comprise at least one of emails received by the first companion user account, emails sent by the first companion user account, email drafts, etc. In some examples, the second resources may not comprise emails sent and/or received by the first primary user account. In an example, the second interface 528 may comprise a list of email items corresponding to emails sent and/or received by the first companion user account (e.g., emails in a mailbox of the first companion user account). In response to a selection of an email item of the list of email items, an email corresponding to the email item may be opened (e.g., displayed) via the second interface 528.

In some examples, the second interface 528 may comprise a second search field 530. A search query may be entered into the second search field 530. In some examples, the search system of the communication system (e.g., the email service provider) may be configured to generate search results based upon the search query entered into the second search field 530. The search results may be generated based upon at least one of emails, messages, social media posts, content items, etc. that are accessible to the first companion user account. For example, data of the first companion user account may be analyzed to identify emails, messages, social media posts and/or content items that are relevant to the search query, wherein the search results may be generated to comprise links to the emails, the messages, the social media posts and/or the content items (that are determined to be relevant to the search query). In some examples, based upon the search query being received via the second search field 530 of the second interface 528 associated with the first companion user account, the search results may not be generated based upon emails, messages, social media posts and/or content items of the first primary user account (e.g., merely emails, messages, social media posts and/or content items of the first companion user account may be analyzed to generate the search results since the search query was received via the second interface 528 associated with the first companion user account).

At 408, a first content targeting profile associated with the first companion user account may be generated based upon activity associated with the first companion user account and/or the one or more interests selected by the first user. For example, the first content targeting profile may be generated based upon the user-selected data (e.g., the user-selected data is indicative of the one or more interests and/or comprises the set of user-selected data associated with the first primary user account). Alternatively and/or additionally, the activity (e.g., the activity based upon which the first content targeting profile is generated) may comprise searches performed using the second interface 528 (e.g., searches performed using the second search field 530). For example, the first content targeting profile may comprise search queries of the searches. Alternatively and/or additionally, the activity may comprise interactions of the first user with emails, messages, social media posts and/or content items of the first companion user account. For example, the activity may comprise emails, messages, social media posts and/or content items being selected and/or opened via the second interface 528 (e.g., keywords and/or topics associated with the emails, messages, social media posts and/or content items may be included in the first content targeting profile). Alternatively and/or additionally, the activity may comprise emails, messages and/or social media posts being composed, posted and/or sent to other user accounts using the second interface 528 and/or the first companion user account (e.g., keywords and/or topics associated with the emails, messages, social media posts and/or content items may be included in the first content targeting profile).

In some examples, the first content targeting profile may be updated periodically (e.g., once per hour, once per day, once per week, etc.). In an example, the first content target profile may be updated based upon recent activity performed using the first companion user account. Alternatively and/or additionally, the first content targeting profile 560 may be updated in real time in response to detecting activity of the first companion user account (e.g., the first content targeting profile 560 may be updated based upon the detected activity).

At 410, a plurality of content items may be received from a plurality of entities. In an example, the plurality of entities may be associated with at least one of brands, companies, organizations, advertisers, subscription services, etc. The plurality of content items may comprise at least one of emails, messages, social media posts, advertisements, images, videos, audio files, etc. The plurality of content items may be received by the communication system (e.g., the email service provider).

The plurality of content items may comprise a first content item received (by the communication system 540, for example) from a first entity. The first content item may comprise content associated with at least one of an advertisement, a sale, an announcement, a promotion, etc. (e.g., the first content item may be sent by the first entity to promote at least one of the advertisement, the sale, etc.). In an example, the first entity may be a user account (e.g., an email account) associated with at least one of an advertiser (e.g., an advertiser that advertises products and/or services), a company (e.g., a company that sells products and/or services), a shopping website (e.g., a shopping website with which products and/or services can be purchased), a store (e.g., a store in which products and/or services can be purchased), a brand, an organization, etc. For example, the user account (e.g., the email account) may be used for sending at least one of promotions, marketing material, announcements, newsletters, etc. associated with at least one of the advertiser, the company, the shopping website, the store, the brand, the organization, etc.

Figure 5D:
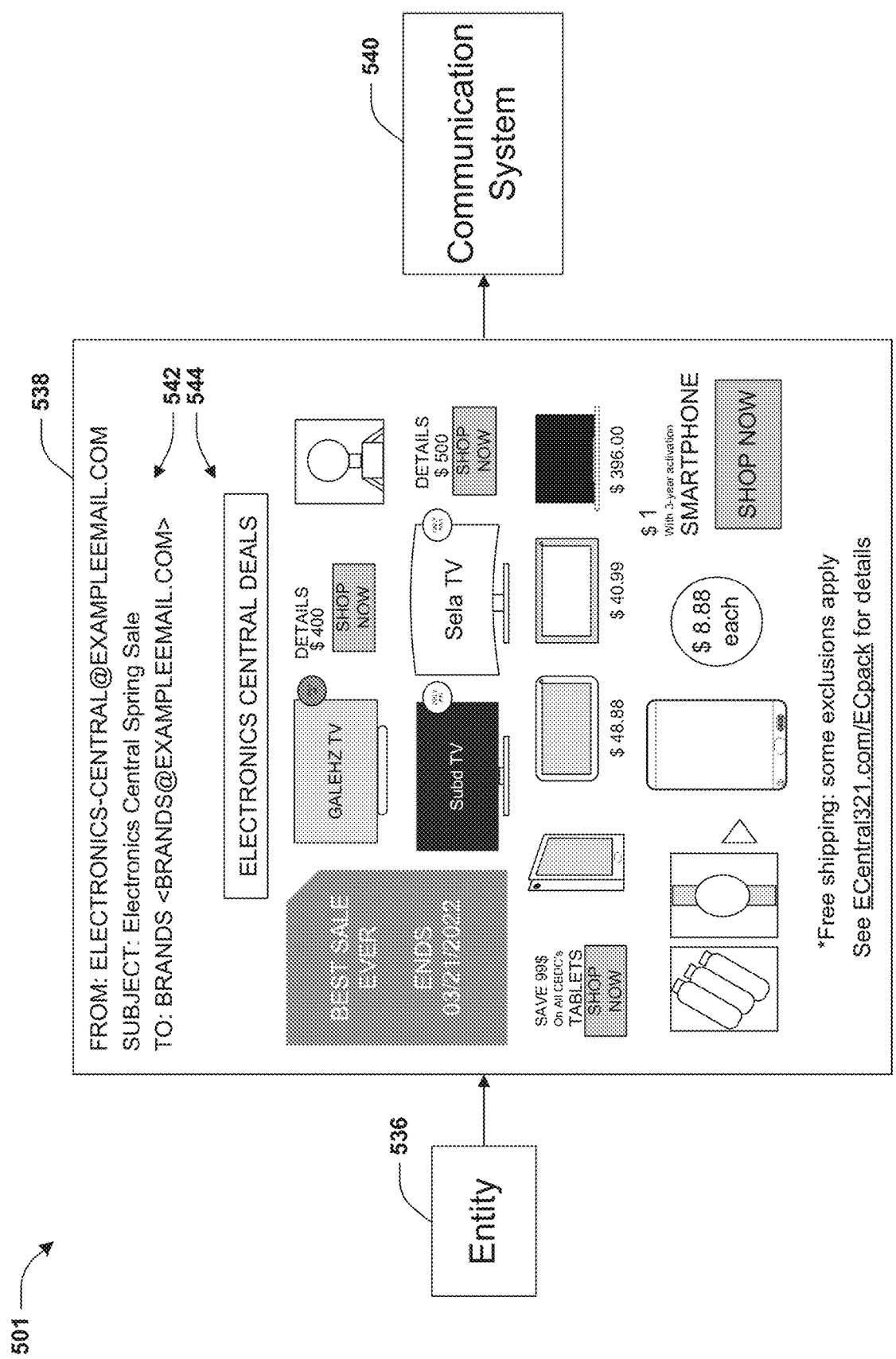
FIG. 5D is a component block diagram illustrating an example system for generating a companion user account and/or providing content using the companion user account, where a first content item is received by a communication system.

FIG. 5D illustrates the first content item (shown with reference number 538) being received by the communication system (shown with reference number 540) from the first entity (shown with reference number 536). In an example shown in FIG. 5A, the first entity 536 may be associated with an electronics store "Electronics Central", wherein the first content item 538 may be sent by the first entity 536 to promote a sale at the electronics store and/or to promote products sold at the electronics store. In the example shown in FIG. 5D, the first content item 538 may comprise a third email comprising an email header 542. The email header 542 may comprise at least one of an indication of a first sender email address of the first entity 536 (e.g., "ELECTRON ICS-CENTRAL@EXAMPLEEMAILCOM" shown in FIG. 5D), an indication of a subject of the third email (e.g., "Electronics Central Spring Sale" shown in FIG. 5D), an indication of a recipient email address to which the third email is addressed (e.g., "BRANDS@ EXAMPLEEMAILCOM" shown in FIG. 5D), an indication of a time that the third email is sent and/or delivered, an indication of a return-path email address, etc. The third email may comprise an email body 544 comprising content (e.g., text, one or more images, one or more links, etc.). For example, the email body 544 may comprise information associated with prices of products on sale.

In some examples, the third email may be transmitted by a client device associated with the first entity to a first mail agent (e.g., a first mail transfer agent (MTA) and/or a first mail delivery agent (MDA)). The first mail agent may transmit the third email to a second mail agent (e.g., a second MTA and/or a second MDA) via one or more networks (e.g., via the Internet). The communication system 540 may receive the third email from the second mail agent. Alternatively and/or additionally, the communication system 540 may comprise the second mail agent (e.g., the second mail agent may be a MTA and/or a MDA for the email service provider of the communication system 540).

In some examples, in response to receiving a content item of the plurality of content items, such as the first content item 538, the communication system 540 may store the content item in a content item database. The content item database may be used for storing content items (e.g., at least one of emails, messages, social media posts, advertisements, images, videos, audio files, etc.) that are to be targeted to and/or sent to companion user accounts associated with the communication system (e.g., the first companion user account and/or other companion user accounts that are generated using one or more of the techniques provided herein with respect to the first companion user account) and/or other types of user accounts. For example, a content item may be stored in the content item database based upon a determination that the content item is to be targeted to and/or sent to companion user accounts associated with the communication system. In an example in which the plurality of content items comprises emails, an email (e.g., the third email) of the emails may be stored in the content item database based upon a determination that the email is addressed to the recipient email address (e.g., "BRANDS@EXAMPLEEMAIL.COM"). For example, an entity of the plurality of entities may transmit an email (e.g., a content item of the plurality of content items) that is addressed to the recipient email address (e.g., "BRANDS@EXAMPLEEMAIL.COM") such that the email is stored in the content item database and/or such that the email is targeted to and/or sent to companion user accounts associated with the communication system 540. In an example, an email addressed to an email address different than the recipient email address (and/or different than one or more other defined recipient email addresses) may not be stored in the content item database and/or may not be targeted to and/or sent to companion user accounts associated with the communication system 540 (unless the email address to which the email is addressed is an email address of a companion user account associated with the communication system 540, in which case the email may be directly sent to the companion user account).

In an example, since a user may disregard an advertising email that is categorized as a "marketing email" (due to the one or more categorization services enabling the user to view emails without having to scroll through emails categorized as marketing emails, for example), an entity (e.g., an advertiser) that sent the advertising email may be motivated and/or compelled to attempt the user by other means, such as by enlisting services of the communication system 540 to access users via companion accounts (e.g., the entity may be motivated and/or compelled to send content items to the communication system 540 for the communication system 540 to send to user companion accounts).

In an example, since a user may disregard undesired emails associated with an undesired category (due to the one or more categorization services enabling the user to view emails without having to scroll through emails categorized as a category that the user does not have an interest in, for example), an entity (e.g., an advertiser) that sent the undesired emails (such as containing spam) may be motivated and/or compelled to cease sending undesired emails since they are not being consumed and/or acted upon. Thus, fewer undesired emails (e.g., spam emails) may be sent to user accounts of the communication system 540.

Figure 5E:
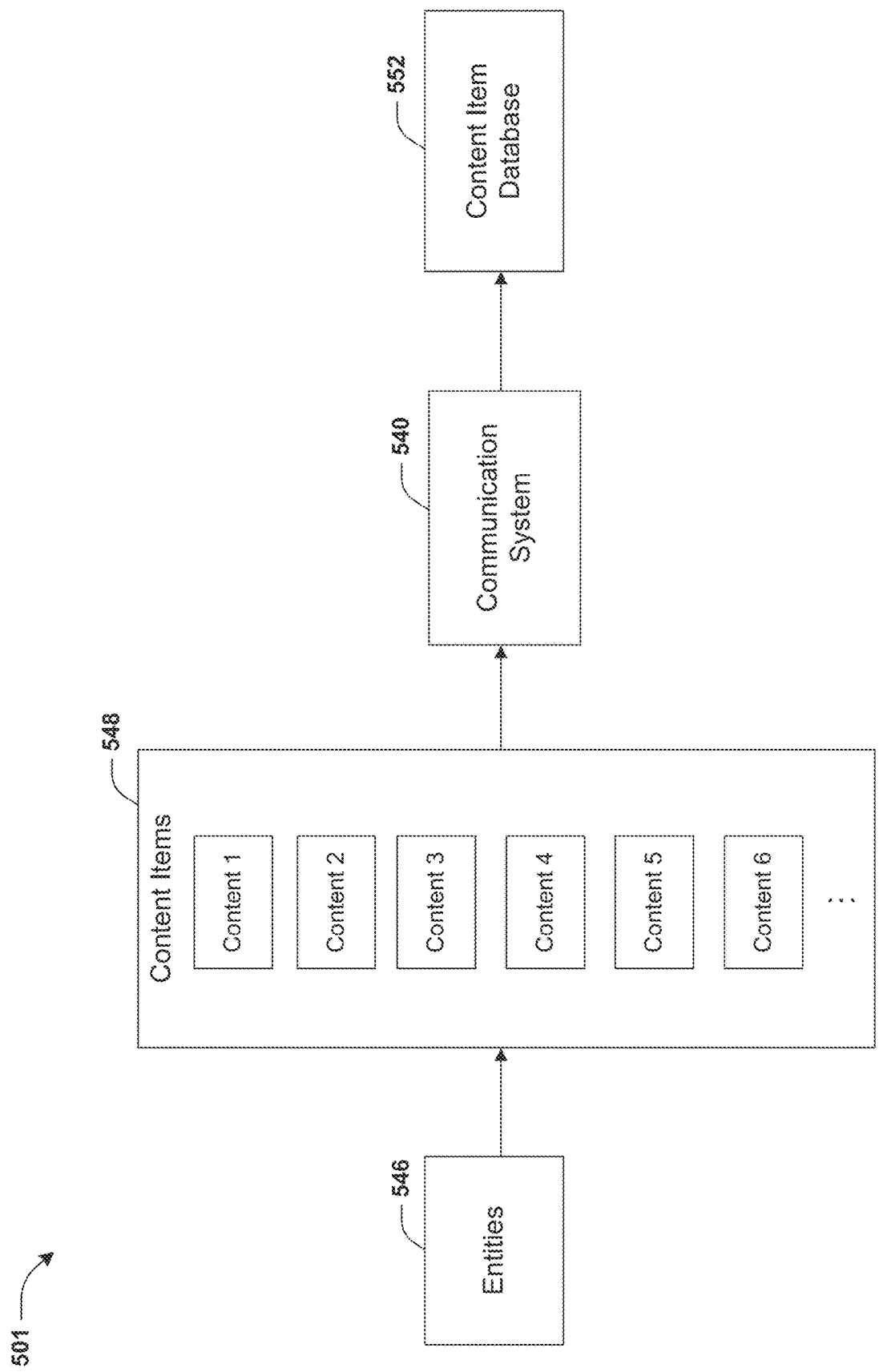
FIG. 5E is a component block diagram illustrating an example system for generating a companion user account and/or providing content using the companion user account, where a communication system receives content items from one or more entities and/or stores the content items in a content item database.

FIG. 5E illustrates the communication system 540 receiving the plurality of content items (shown with reference number 548) from the plurality of entities (shown with reference number 546). The communication system 540 may store the plurality of content items 548 in the content item database (shown with reference number 552). In an example, the plurality of content items 548 may comprise emails (e.g., emails addressed to the recipient email address) and/or the content item database 552 may comprise an email database. In an example in which the plurality of content items 548 comprises emails, the emails may comprise emails that are part of subscription services, such as emails that may be sent to email accounts subscribed to the subscription services. For example, an entity of the plurality of entities 546 may send a subscription email to email addresses subscribed to a subscription service associated with the entity and to the recipient email address. In this way, the subscription email may be sent to both email accounts that are subscribed to the subscription service and to email accounts (e.g., companion email accounts) to which the subscription email is targeted (by the communication system 540).

At 412, a subset of content items may be selected from among the plurality of content items 548 (e.g., content items stored in the content item database 552) for presentation via the second interface 528 (e.g., the second email interface) associated with the first companion user account. For example, the subset of content items may be selected based upon the first content targeting profile associated with the first companion user account. The subset of content items may comprise one or more content items, of the plurality of content items 548, targeted to the first companion user account.

Figure 5F:
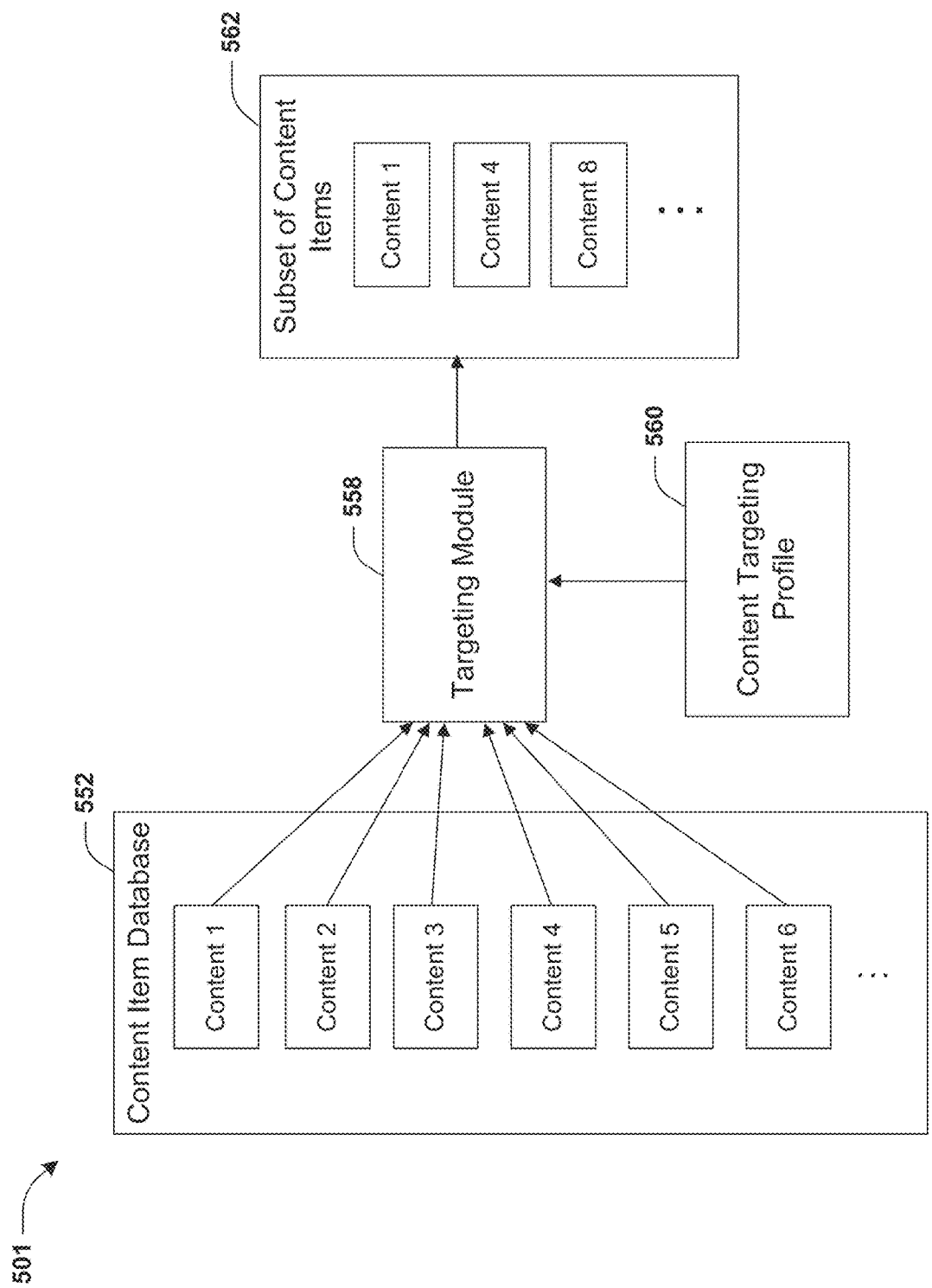
FIG. 5F is a component block diagram illustrating an example system for generating a companion user account and/or providing content using the companion user account, where a subset of content items is selected from a plurality of content items based upon a content targeting profile.

FIG. 5F illustrates the subset of content items 562 being selected from the plurality of content items 548 (e.g., content items stored on the content item database 552) using a targeting module 558. For example, the first content targeting profile (shown with reference number 560) may be input to the targeting module 558, and/or the targeting module 558 may select the subset of content items 562, from the plurality of content items 548, based upon the first content targeting profile 560.

In some examples, the subset of content items 562 comprise the first content item 538. The first content item 538 may be selected for presentation via the second interface 528 associated with the first companion user account (e.g., the first content item 538 may be targeted to the first companion user account) based upon a determination that information of the first content targeting profile 560 (e.g., the information may be indicative of one or more topics, one or more search queries, one or more keywords, one or more interests, etc.) matches one or more topics associated with the first content item 538. The one or more topics may be indicated by content item information associated with the first content item 538.

In an example, the information of the first content targeting profile 560 may comprise an indication of a search query comprising "phones", and the content item information associated with the first content item 538 may indicate that a topic of the first content item 538 is "electronics". In the example, the first content item 538 may be selected for presentation via the second interface 528 associated with the first companion user account (e.g., the first content item 538 may be targeted to the first companion user account) based upon a determination that the search query "phones" matches the topic "electronics". The determination that the search query "phones" matches the topic "electronics" may correspond to a determination that "phones" is related to and/or part of the topic "electronics".

In an example, the information of the first content targeting profile 560 may comprise an indication of an interest "video game consoles" selected by the first user (e.g., the interest "video game consoles" may be selected via the interest selection interface), and the content item information associated with the first content item 538 may indicate that a topic of the first content item 538 is "electronics". In the example, the first content item 538 may be selected for presentation via the second interface 528 associated with the first companion user account (e.g., the first content item 538 may be targeted to the first companion user account) based upon a determination that the interest "video game consoles" matches the topic "electronics". The determination that the interest "video game consoles" matches the topic "electronics" may correspond to a determination that "video game consoles" is related to and/or part of the topic "electronics".

At 414, the first content item 538 of the subset of content items 562 is displayed via the second interface 528 associated with the first companion user account. For example, the first content item 538 may be transmitted to the first client device 500 and/or displayed via the second interface 528 in response to selecting the subset of content items 562 comprising the first content item 538.

Figure 5G:
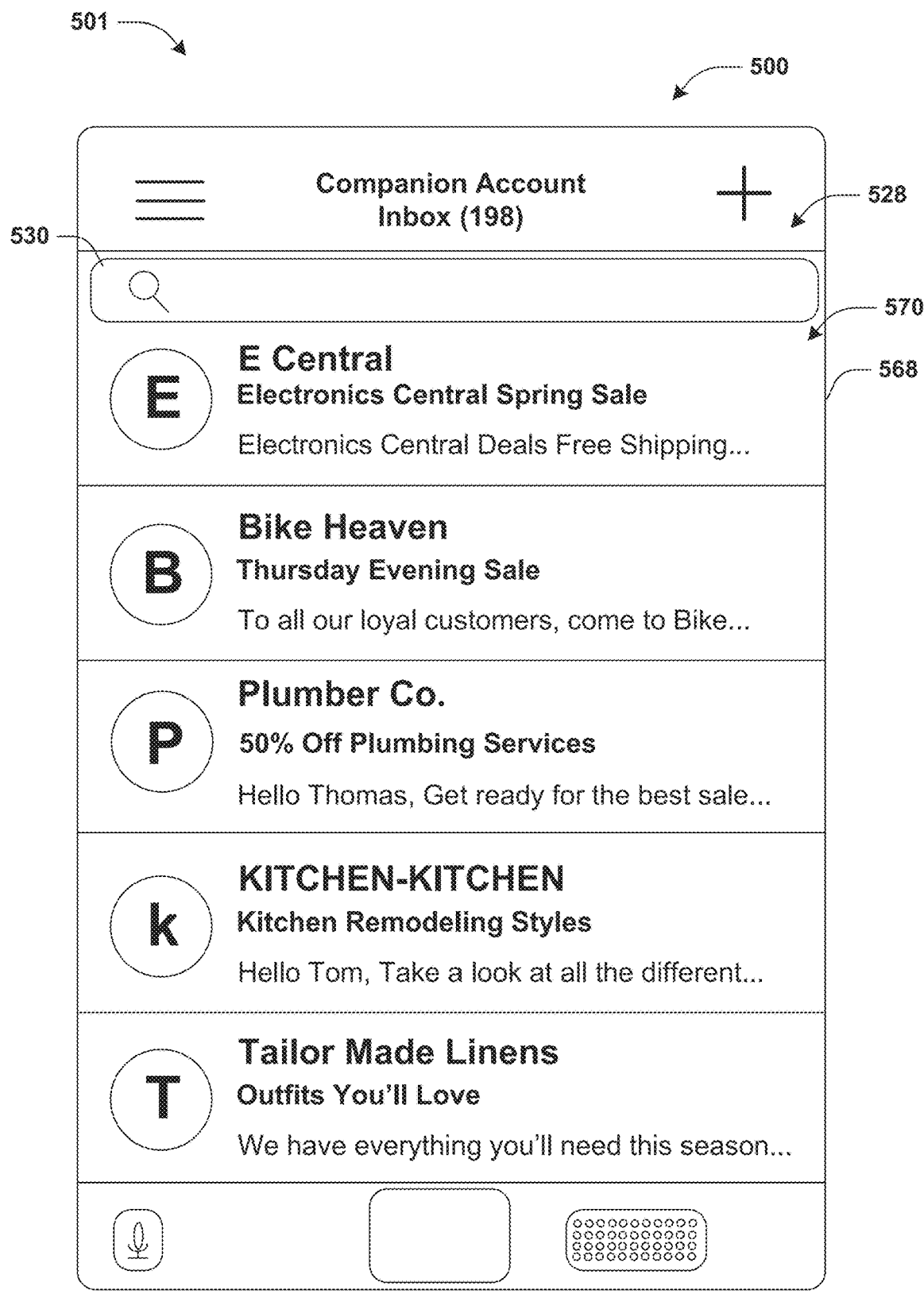
FIG. 5G is a component block diagram illustrating an example system for generating a companion user account and/or providing content using the companion user account, where a list of email items is displayed via a second interface associated with a companion user account.
Figure 5H:
FIG. 5H is a component block diagram illustrating an example system for generating a companion user account and/or providing content using the companion user account, where a first content item is displayed via a second interface associated with a companion user account.

In an example in which the first content item 538 comprises the third email, the third email may be transmitted to the first companion user account (e.g., the first companion email account). For example, the third email may be transmitted to the first companion user account in response to selecting the subset of content items 562 comprising the first content item 538. The third email (e.g., the first content item 538) may be displayed via the second interface 528 in response to receiving (via the second interface 528, for example) a request to display the third email. FIG. 5G illustrates a list of email items 570 being displayed via the second interface 528. The list of email items 570 may comprise an email item 568 associated with the third email (e.g., the first content item 538). The request to display the third email may be received in response to a selection of the email item 568. For example, in response to receiving the selection of the email item 568, the third email (e.g., the first content item 538) may be displayed via the second interface 528. FIG. 5H illustrates the third email (e.g., the first content item 538) being displayed via the second interface 528 associated with the first companion user account.

In some examples, the third email (e.g., the first content item 538) may comprise a subscription email that is sent to email addresses subscribed to a first subscription service associated with the first entity 536. For example, the first subscription service may correspond to a newsletter, a marketing campaign, etc. In some examples, the first content targeting profile 560 may be indicative of one or more subscription services to which the first companion user account is subscribed. For example, the one or more subscription services may comprise the first subscription service. The first companion user account may be subscribed to the first subscription service (associated with the first entity 536) by the communication system 540. For example, the communication system 540 may subscribe (e.g., automatically subscribe) the first companion user account to the first subscription service based upon a determination that information of the first content targeting profile 560 (e.g., the information may be indicative of one or more topics, one or more search queries, one or more keywords, one or more interests, etc.) matches one or more topics associated with the first subscription service. In some examples, in response to determining to subscribe the first companion user account to the first subscription service, the first client application may display a subscription interface comprising an indication of the first subscription service and/or a selectable input corresponding to subscribing to the first subscription service, wherein the communication system 540 may subscribe the first companion user account to the first subscription service in response to a selection of the selectable input (e.g., the selection of the selectable input may correspond to an indication that the first user gives permission to subscribe to the first subscription service). In some examples, the subscription interface may be presented in association with the avatar character (discussed below), such as where the subscription interface comprises a representation of the avatar character and/or where the subscription interface comprises a message indicating that the avatar character is interested in the first subscription service and/or requesting that the first user give permission to subscribe to the first subscription service. In some examples, it may be determined that the first user is interested in the first subscription service (and/or information associated with the first subscription service may be included in the first content targeting profile) based upon reception of an indication that the first user gives permission to subscribe to the first subscription service. Alternatively and/or additionally, in response to determining to subscribe the first companion user account to the first subscription service, the first client application may automatically subscribe the first companion user account to the first subscription service without displaying the subscription interface and/or without receiving permission to subscribe to the first subscription service. In some examples, when the first companion user account is subscribed to the first subscription service (e.g., when the first content targeting profile 560 indicates that the first companion user account is subscribed to the first subscription service), one or more emails that are associated with the first subscription service (e.g., subscription emails that are sent by the first entity 536 and/or that are part of the first subscription service) and/or are addressed to a defined recipient email address (e.g., the recipient email address "BRANDS@EXAMPLE-EMAIL.COM") may be transmitted to the first companion user account (e.g., the one or more emails may be automatically transmitted to the first companion user account in response to receiving the one or more emails when the first companion user account is subscribed to the first subscription service). Accordingly, the first user may not need to provide identifiable information (e.g., information that identifies the first user, the first primary email account and/or the first companion email account, such as an email address of the first primary email account and/or an email address of the first companion email account) to the first entity 536 in order to receive subscription emails of the first subscription service, thereby reducing a risk that the first entity 536 discloses the identifiable information to other entities (without the first user's permission, for example) and/or reducing a risk that the identifiable information is misused by one or more entities.

In some examples, the first content item 538 may comprise at least one of text, an image, a video, an audio file, etc. For example, the first content item 538 may comprise an advertisement that comprises at least one of the text, the image, the video, the audio file, etc.

In a first example, a fourth email may be generated based upon the first content item 538. For example, the fourth email may comprise the first content item 538 (e.g., the fourth email may comprise at least one of the text, the image, the video, the audio file, etc.). The fourth email may be transmitted to the first companion user account (e.g., the first companion email account). For example, the fourth email may be transmitted to the first companion user account in response to selecting the subset of content items 562 comprising the first content item 538. The fourth email (comprising the first content item 538, for example) may be displayed via the second interface 528 in response to receiving (via the second interface 528, for example) a request to display the fourth email (e.g., the request to display the fourth email may be received in response to a selection of an email item associated with the fourth email).

In a second example, the first content item 538 (e.g., at least one of the text, the image, the video, the audio file, etc.) may be displayed via the second interface 528, such as displayed in a location (e.g., a dedicated location) of the second interface 528 (e.g., an area of the second interface 528 configured for presentation of content items, such as advertisements). For example, the first content item 538 may be displayed at the top of the second interface 528 (e.g., within a banner area of the second interface 528), at the side of the second interface 528 (e.g., within a column of the second interface 528), in a pop-up window, overlaying content of the second interface 528, above the list of email items 570, etc.

In some examples, the first content targeting profile 560 may be updated in real time in response to detecting activity of the first companion user account. For example, in response to a search being performed using the second interface 528 (e.g., using the second search field 530), a search query of the search may be included (e.g., automatically and/or immediately included) in the first content targeting profile 560 and/or may be used (e.g., automatically and/or immediately used) to select content to be presented via the second interface 528. For example, in response to the search being performed and/or the search query being included in the first content targeting profile 560, one or more content items (e.g., the subset of content items 562) may be selected from among the plurality of content items 548 for presentation via the second interface 528. The one or more content items may be selected based upon a determination that the search query matches (e.g., is related to and/or part of) one or more topics associated with the one or more content items. A set of search results may be generated based upon the search query, wherein the one or more content items (and/or links to the one or more content items) may be included in the set of search results. Accordingly, the one or more content items may be displayed via the set of search results. That is, even though the one or more content items are not included in an inbox associated with the first companion user account, the one or more content items may be selected from the plurality of content items 548 and included in the set of search results. Accordingly, implementation of at least some of the disclosed subject matter may lead to benefits including, but not limited to, a reduction in screen space and/or an improved usability of a display (e.g., of the first client device 500) (e.g., as a result of automatically providing the first user with access to the one or more content items in the set of search results based upon the search query without the first user needing to open a different application and/or web page to search for and/or find the one or more content items that are relevant to the search query). On an example in which a content item of the one or more content items is an email, the email may be transmitted to the first companion user account and/or an email item associated with the email may be included in the set of search results, wherein the email may be displayed in response to a selection of the email item. Thus, even though the first companion user account may not have previously been sent the email, the email may be transmitted to the first companion user account and/or the email item (associated with the email) may be included in the set of search results generated based upon the search query.

Alternatively and/or additionally, the first content targeting profile 560 may be indicative of a location of the first client device 500. In some examples, the location of the first client device 500 indicated by the first content targeting profile 560 may be updated, such as updated periodically and/or updated in response to receiving location information from the first client device 500. In some examples, the location indicated by the first content targeting profile 560 may be compared with areas associated with content items of the plurality of content items 548. For example, the location indicated by the first content targeting profile 560 may be compared with a first area associated with the first content item 538. The first area may correspond to an area (e.g., a geographical region) of a property associated with the first content item 538 and/or the first entity 536. In an example, the first area may correspond to an area occupied by a store that sells products and/or services promoted by the first content item 538. Accordingly, a determination that the location indicated by the first content targeting profile 560 is within the first area may correspond to a determination that the first user of the first client device 500 is within the store associated with the first content item 538. In response to a determination that the location indicated by the first content targeting profile 560 is within the first area (e.g., a determination that the user of the first client device 500 is within the store associated with the first content item 538), the first content item 538 may be selected from the plurality of content items 548 for presentation via the second interface 528. In response to selecting the first content item 538 for presentation via the second interface 528, the first content item 538 may be transmitted to the first companion user account and/or may be displayed via the second interface 528. Accordingly, while the first user is in the store, the first content item 538 may be provided to the first user such that the first user can view sales and/or deals at the store that are indicated by the first content item 538. In some examples, in response to the determination that the location indicated by the first content targeting profile 560 is within the first area (e.g., the determination that the user of the first client device 500 is within the store associated with the first content item 538), the first content item 538 may be presented (e.g., automatically presented) in association with the avatar character (discussed below), such as where the first content item 538 is displayed in conjunction with displaying a representation of the avatar character.

In some examples, the one or more conditions associated with the first companion user account and/or the second status comprise a condition that at least one companion user account associated with the first client application (e.g., the first companion user account) be active (e.g., not be deactivated). For example, in response to the first companion user account being deactivated (by the first user or by the communication system 540, for example), if there are no other active companion user accounts associated with the first client application, the service status of the first primary user account (and/or the first client application) may be changed from the second status (e.g., the premium service status) to the first status (e.g., the non-premium service status). Alternatively and/or additionally, in response to the first companion user account being deactivated (by the first user or by the communication system 540, for example), if there are no other active companion user accounts associated with the first client application, a second companion user account associated with the first client application may be generated (e.g., automatically generated by the communication system 540) such that the one or more conditions are met (e.g., the service status of the first primary user account may remain the second status and/or may not be changed to the first status).

In some examples, the one or more conditions associated with the first companion user account and/or the second status comprise a condition that the second interface 528 associated with the first companion user account be accessed and/or used at least n times per m amount of time. In an example, n may be one and m may be one week, where the condition may be met if the second interface 528 is accessed and/or used at least once per week. In some examples, in response to a determination that the second interface 528 has not been accessed and/or used at least n times per m amount of time, the service status of the first primary user account (and/or the first client application) may be changed from the second status (e.g., the premium service status) to the first status (e.g., the non-premium service status). Alternatively and/or additionally, in response to a determination that the second interface 528 has not been accessed in over a threshold amount of time, the second interface 528 may be displayed (e.g., automatically displayed), thereby resulting in the condition being met. For example, although the first client application may by default be configured to display the first interface 522 associated with the first primary user account in response to the first client application being opened, based upon the determination that the second interface 528 has not been accessed in over the threshold amount of time, the second interface 528 may be displayed (e.g., automatically displayed) in response to the first client application being opened.

In some examples, a communication entity associated with the communication system 540 may receive compensation from the first entity 536 in exchange for presenting the first content item 538 via interfaces (e.g., the second interface 528) associated with companion user accounts (e.g., the first companion user account).

Alternatively and/or additionally, in an example in which the communication system 540 transmits an email (e.g., the third email or the fourth email) corresponding to the first content item 538 to the first companion user account (e.g., the first companion email account), the communication entity associated with the communication system 540 may receive compensation from the first entity 536 in exchange for: (i) transmitting the email to the first companion user account such that the email (e.g., the first content item 538) is accessible via the second interface 528; and/or (ii) triggering a notification (e.g., a push notification) to alert the first user that the email is transmitted to the first companion user account such that the first user is informed that the first user can access the email, such as where the notification is displayed on a screen of the first client device 500 using an operating system of the first client device 500. In some examples, an amount of compensation received by the communication entity from the first entity 536 may be based upon whether or not the notification is triggered and/or displayed. For example, in a scenario in which the email is transmitted to the first companion user account without triggering the notification, the amount of compensation may be less than in a scenario in which the email is transmitted to the first companion user account and the notification is triggered.

Alternatively and/or additionally, in an example in which the first companion user account is subscribed to the first subscription service (associated with the first entity 536) by the communication system 540, the communication entity associated with the communication system 540 may receive compensation from the first entity 536 in exchange for: (i) subscribing the first companion user account to the first subscription service associated with the first entity 536; and/or (ii) transmitting subscription emails (that are part of the first subscription service) received from the first entity 536 to the first companion user account.

In some examples, the first companion user account may be used by the first user to subscribe to one or more subscription services. For example, the first user may provide an email address of the first companion user account to an entity to subscribe the first companion user account to a subscription service associated with the entity. When the first companion user account is subscribed to the subscription service, the entity may transmit subscription emails of the subscription service to the first companion user account. Accordingly, generating the first companion user account for the first client application enables the first user to subscribe to the subscription service without having to provide identifiable information (e.g., information that identifies the first user and/or the first primary email account, such as an email address of the first primary email account), thereby reducing a risk that the entity discloses the identifiable information to other entities (without the first user's permission, for example) and/or reducing a risk that the identifiable information is misused by one or more entities.

In some examples, an avatar character associated with the first companion user account may be generated and/or presented via the first client application. In some examples, characteristics (e.g., visual characteristics) of the avatar character may be customized via the first client application (e.g., the first user may customize characteristics of the avatar character via the first client application). In an example, the avatar character may have an identifier (that identifies the avatar character), such as the username of the first companion user account (e.g., an email address of the first companion email account). In some examples, the first user may interact with the avatar character via two-way communication. For example, a conversational interface (e.g., a chat interface, a voice interface, etc.) provided by the first client application may be used to conduct a conversation (e.g., a chat conversation, a voice conversation, etc.) between the first user and an agent (e.g., a chatbot, a virtual assistant, etc.) corresponding to the avatar character. In some examples, the first client application may display a representation of the avatar character during the conversation to make it appear as though the first user is conversing with the avatar character. For example, in response to the first user submitting a message in the conversation, the agent may determine an intention of the message, wherein one or more actions may be performed based upon the determined intention. The one or more actions may be performed (by the communication system 540, for example) to facilitate performance of one or more tasks associated with at least one of the first primary user account, the first companion user account, etc. For example, the one or more tasks may comprise at least one of deleting a message and/or email, modifying one or more settings associated with the one or more content categorization services (e.g., email categorization services), setting up one or more filters, setting up one or more bill reminders, creating one or more disposable email addresses, etc. In some examples, the one or more actions may comprise generating a response (e.g., a response to the message submitted by the first user) and/or presenting the response to the first user (e.g., displaying the response via the chat interface, outputting the response via a speaker of the first client device 500, etc.). Alternatively and/or additionally, the one or more actions may comprise performing the one or more tasks.

In an example in which the message submitted by the first user comprises "create a disposable email address", the one or more actions may comprise generating a disposable email address, generating the response (that is indicative of the disposable email address), and/or presenting the response to the first user.

In some examples, the message submitted by the first user comprises a request to provide content associated with a topic. For example, the message may comprise "find the latest deals on cameras", where the topic is "cameras". The one or more actions may comprise selecting one or more content items (e.g., the subset of content items 562) from among the plurality of content items 548 for presentation via the second interface 528. The one or more content items may be selected based upon a determination that the topic matches (e.g., is related to and/or part of) one or more topics associated with the one or more content items (e.g., the one or more content items may comprise one or more emails, messages, advertisements, etc. indicative of prices and/or specifications of one or more cameras). The one or more content items may be presented via the second interface 528. Alternatively and/or additionally, if a content item of the one or more content items contains outdated information, the content item may be modified to generate a modified version of the content item, wherein the modified version of the content item may be presented via the second interface 528. In an example, a content item of the one or more content items may be analyzed to determine a price (e.g., a price of a product and/or service) indicated by the content item. A request to confirm the price may be transmitted to an entity (of the plurality of entities, for example) associated with the content item. In response to the request, the entity may transmit a message to the communication system 540. In a first example, the message transmitted by the entity may indicate that the price is correct, where based upon the message, the communication system 540 may provide the content item (e.g., an unmodified version of the content item) to the first client device 500 for presentation (via the second interface 528, for example). In a second example, the message transmitted by the entity may indicate that the price is outdated and/or may indicate an updated price, where based upon the message, the communication system 540 may modify the content item to generate a modified version of the content item indicative of the updated price, where the communication system 540 may provide the modified version of the content item to the first client device 500 for presentation (via the second interface 528, for example).

Figure 5I:
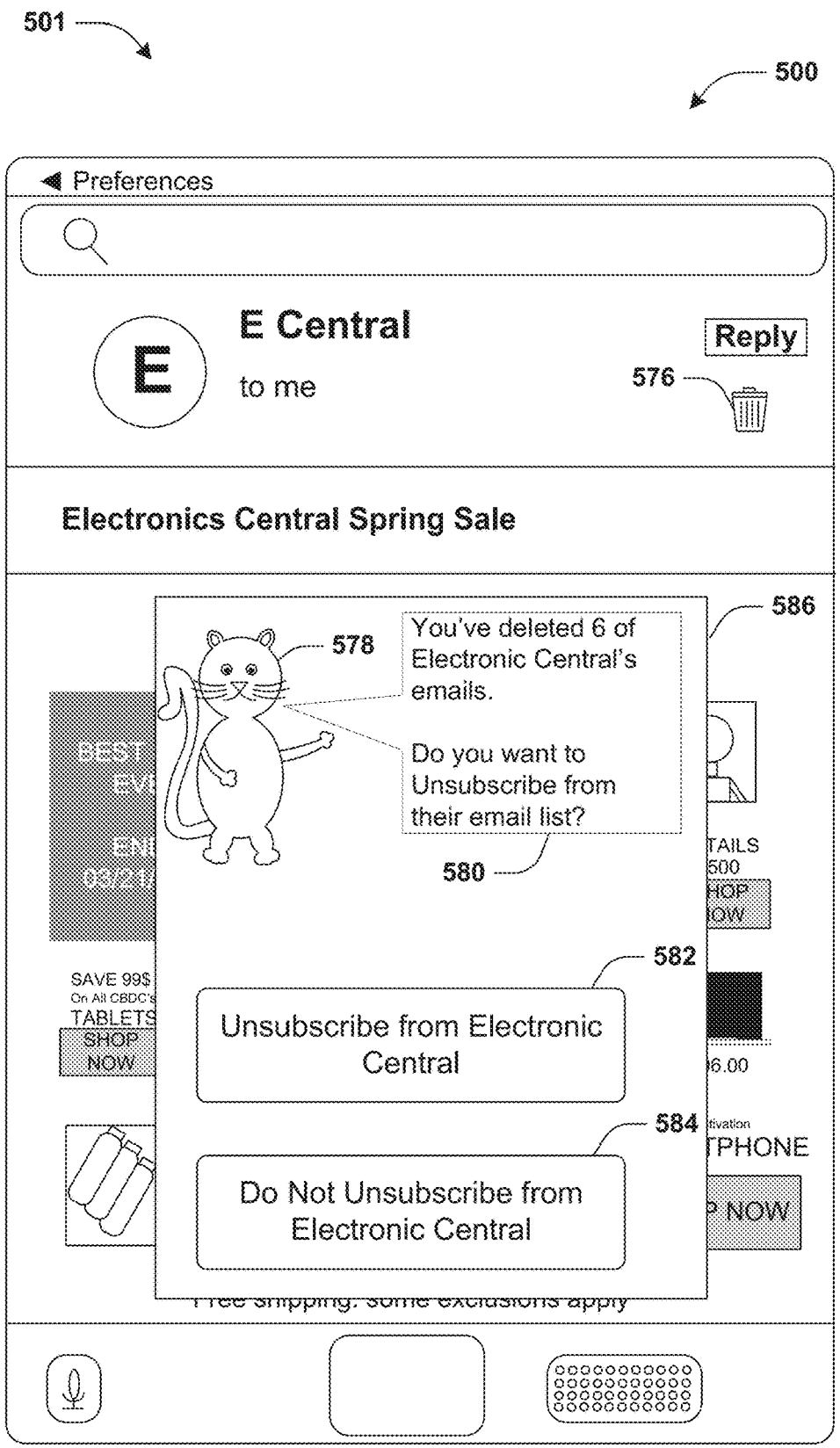
FIG. 5I is a component block diagram illustrating an example system for generating a companion user account and/or providing content using the companion user account, where an unsubscribe interface is displayed via a second interface associated with a companion user account.

Alternatively and/or additionally, in an example in which the first companion user account is subscribed to the first subscription service (associated with the first entity 536), activity associated with emails of the first subscription service may be monitored. In some examples, a quantity of deleted emails, associated with the first subscription service, that are deleted via the second interface 528 may be tracked (e.g., the quantity of deleted emails may correspond to a quantity of emails that are part of the first subscription service and/or that are deleted by the first user). In an example, an email may be deleted in response to a selection of a delete selectable input 576 (shown in FIGS. 5H-5I). FIG. 5I illustrates an unsubscribe interface 586 being displayed. The unsubscribe interface 586 may be displayed (via the second interface 528, for example) in response to a determination that the quantity of deleted emails meets (e.g., is equal to or exceeds) a threshold quantity of deleted emails. For example, the quantity of deleted emails meeting the threshold quantity of deleted emails may show that the first user may not want to receive emails of the first subscription service. The unsubscribe interface 586 may comprise a representation 578 of the avatar character. The unsubscribe interface 586 may comprise a message 580 requesting the first user to choose whether or not to unsubscribe from the first subscription service, a selectable input 582 associated with unsubscribing from the first subscription service and/or a selectable input 584 associated with not unsubscribing from the first subscription service. In some examples, in response to a selection of the selectable input 582 associated with unsubscribing from the first subscription service, the first companion user account may be unsubscribed from the first subscription service and/or the communication service may cease transmitting content items (e.g., emails), that are part of the first subscription service and/or that are from the first entity 536, to the first companion user account. Alternatively and/or additionally, in response to a selection of the selectable input 584 associated with not unsubscribing from the first subscription service, the first companion user account may not be unsubscribed from the first subscription service and/or the communication service may continue transmitting content items (e.g., emails), that are part of the first subscription service and/or from the first entity 536, to the first companion user account.

In some examples, a plurality of companion user accounts, comprising the first companion user account, may be generated for the first client application. For example, one or more companion user accounts of the plurality of companion user accounts may be generated using one or more of the techniques provided herein with respect to generating the first companion user account. In some examples, a plurality of content targeting profiles associated with the plurality of companion user accounts may be generated and/or updated (such as using one or more of the techniques provided herein with respect to generating and/or updating the first content targeting profile 560). In some examples, for each companion user account of the plurality of companion user accounts, the first client application may provide an interface for accessing resources of the companion user account. In an example in which the plurality of companion user accounts comprises the first companion user account and a second companion user account, the first client application may provide the second interface 528 for accessing resources of the first companion user account and may provide a third interface for accessing resources of the second companion user account. In some examples, the third interface is different than the second interface 528 (and/or the resources of the first companion user account may be provided separately from the resources of the second companion user account). In some examples, content may be targeted to the first companion user account based upon the first content targeting profile 560 and/or content may be targeted to the second companion user account based upon a second content targeting profile, of the plurality of content targeting profiles, associated with the second companion user account.

It may be appreciated that generating the first content targeting profile based upon activity associated with the first companion user account and/or using the first content targeting profile to target content to the first user may create a closed-loop process allowing events (e.g., at least one of events in which searches are performed using the second interface 528, events in which the first user interacts with emails, messages, social media posts and/or content items of the first companion user account, events in which emails, messages, social media posts and/or content items are selected and/or opened via the second interface 528, events in which emails, messages and/or social media posts are composed, posted and/or sent to other user accounts using the second interface 528, etc.) associated with the first companion user account as feedback to tailor parameters of the communication system 540 (such as by generating the first content targeting profile based upon the activity associated with the first companion user account, selecting content for presentation via the second interface 528 associated with the first companion user account, etc.). Closed-loop control may reduce errors and produce more efficient operation of a computer system which implements the communication system 540. The reduction of errors and/or the efficient operation of the computer system may improve operational stability and/or predictability of operation. Accordingly, using processing circuitry to implement closed loop control described herein may improve operation of underlying hardware of the computer system.

It may be appreciated that the disclosed subject matter may assist the first user (and/or the first client device 500 associated with the first user) in engaging with at least one of messages, emails, content items, social media posts, etc. of the first primary user account without being distracted by content items (e.g., advertisements) targeted to the first user. Further, the first user may have more control over personal data that is used for targeting content to the first user and/or the first user may have more control over a level of privacy of the first primary user account.

Implementation of at least some of the disclosed subject matter may lead to benefits including, but not limited to, a reduction in screen space and/or an improved usability of a display (e.g., of the first client device 500) (e.g., as a result of automatically selecting one or more content items to be presented to the first user, not displaying the one or more content items via the first interface 522 such that the first user is not distracted by the one or more content items while using the first interface 522, displaying the one or more content items on the second interface 528 associated with the first companion user account, etc.).

Alternatively and/or additionally, implementation of at least some of the disclosed subject matter may lead to benefits including, but not limited to, a reduction in screen space and/or an improved usability of a display (e.g., of the first client device 500) (e.g., as a result of automatically providing one or more content items to the first user based upon a location of the first user, such that the first user does not need to open a different application and/or web page to search for and/or find the one or more content items associated with the location).

Alternatively and/or additionally, implementation of at least some of the disclosed subject matter may lead to benefits including, but not limited to, a reduction in screen space and/or an improved usability of a display (e.g., of the first client device 500) (e.g., as a result of automatically providing one or more content items, of the content item database 552, to the first user based upon a search query of a search performed by the first user using the second interface 528, such that the first user does not need to open a different application and/or web page to search for and/or find the one or more content items associated with the search query).

In some examples, in response to a selection of an email item (e.g., an email item of the list of email items 570 displayed via the second interface 528), a summary of an email associated with the email item may be displayed. In an example, a graphical object, comprising the summary, may be displayed via the first client device 500 in response to the selection of the email item. In some examples, the graphical object may make up merely a portion of the second interface 528 and/or merely a portion of a display of the first client device 500. Alternatively and/or additionally, while the graphical object is displayed, in response to a selection (e.g., a click and/or a finger touch) of an area outside the graphical object (e.g., an area, of the second interface 528 and/or the display, that is offset from the graphical object), the graphical object may be closed and/or no longer displayed (e.g., at least a portion of a graphical user interface displayed prior to the selection of the email item may be made visible by closing and/or no longer displaying the graphical object). In an example, the graphical object may comprise a selectable input associated with accessing the email (e.g., in response to a selection of the selectable input, a representation of the email, such as an entirety of the email, may be displayed via the second interface 528, such as where the first client device 500 may be redirected to a page comprising the representation of the email). In some examples, the summary may comprise one or more sections of the email. Alternatively and/or additionally, the summary may comprise one or more sections, of the email, that are determined to be more important than other sections of the email. Accordingly, the first user may quickly and/or conveniently navigate through summaries of emails via a page comprising one or more lists of email items displayed by the second interface 528 without redirecting from the page and/or closing the page.

In some examples, the first client device 500 is configured to display a menu listing one or more features (e.g., selectable features) of the communication system 540. The one or more features may comprise at least one of an email feature, a messaging feature, a social media feed feature, etc. In an example, in response to a selection of the email feature, the email feature may provide one or more resources (e.g., data, an interface, etc.) for at least one of displaying emails, composing emails, sending emails, engaging with emails, etc. (such as using one or more of the techniques provided herein). In response to a selection of the messaging feature, the messaging feature may provide one or more resources (e.g., data, an interface, etc.) for displaying and/or facilitating messaging conversations (e.g., private messaging conversations and/or public messaging conversations) between users of the communication system 540 (e.g., users of the communication system 540 may send messages to each other using the messaging feature of the communication system 540). In response to a selection of the social media feed feature, the social media feed feature may provide one or more resources (e.g., data, an interface, etc.) for displaying social media posts and/or comments on a social media platform. In some examples, the first client device 500 is configured to display an email platform application summary that can be reached directly from the menu, wherein the email platform application summary displays a limited list of data offered within the one or more features. In some examples, each of the data in the limited list of data is selectable to launch the respective feature (of the one or more features) and enable the selected data to be seen within the respective feature. In some examples, the email platform application summary is displayed while the one or more features are in an un-launched and/or unopened state.

In some examples, at least some of the disclosed subject matter may be implemented on a client device, and in some examples, at least some of the disclosed subject matter may be implemented on a server (e.g., hosting a service accessible via a network, such as the Internet).

Figure 6:
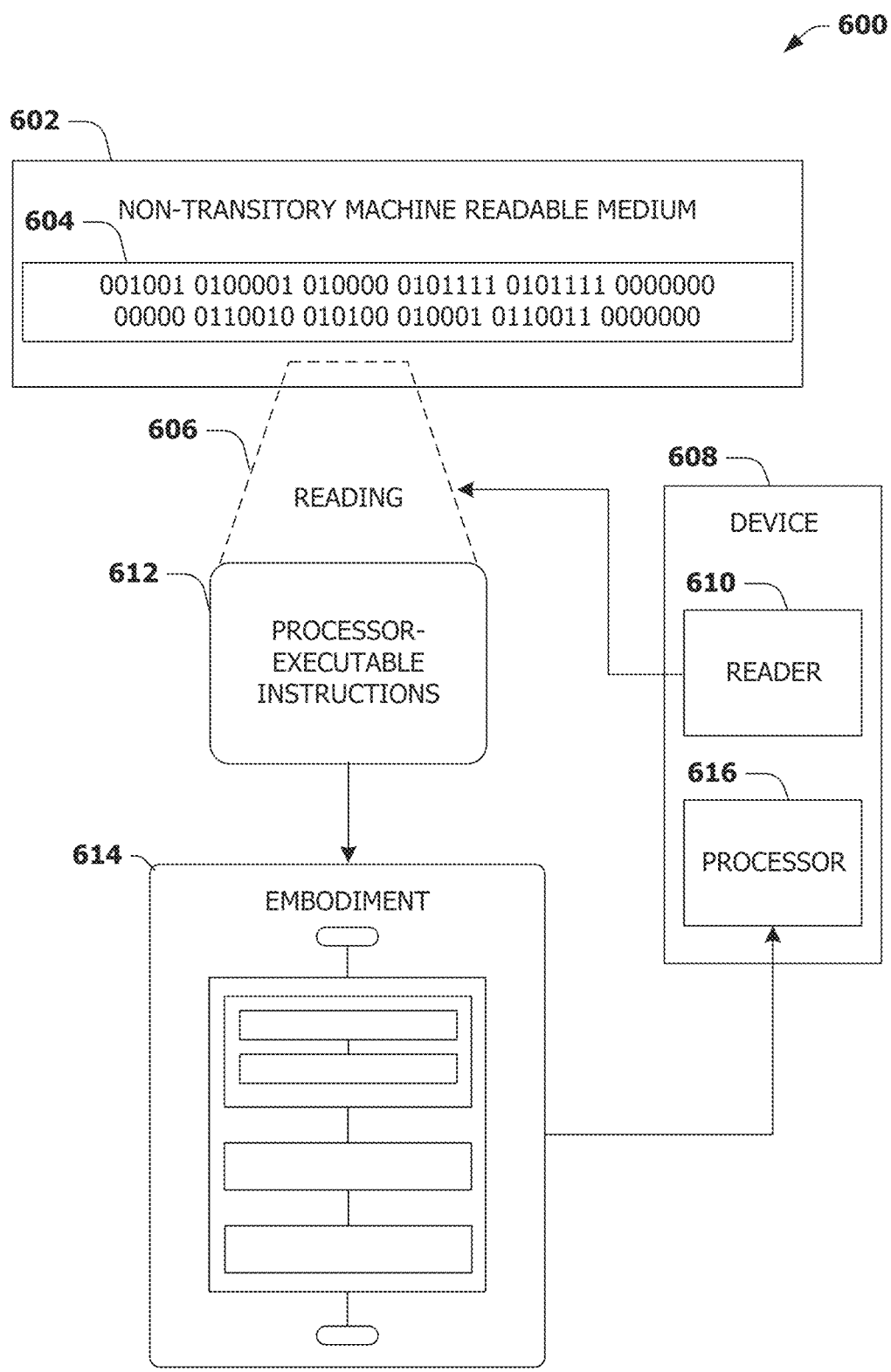
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the exemplary system 501 of FIGS. 5A-5I, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
upon installation of an email client application on a client device, generating a companion email account without a user of the client device specifying an email address of the companion email account, wherein the companion email account is different than a primary email account of the user;
displaying, via the email client application, a first email interface that provides access to resources associated with the primary email account;
displaying, via the email client application, a second email interface that provides access to resources associated with the companion email account;

generating a content targeting profile indicative of a location of the client device and associated with the companion email account based upon at least one of:
activity associated with the companion email account; or
one or more interests selected by the user;
receiving, from a plurality of entities, a plurality of content items;
selecting, from among the plurality of content items and based upon the content targeting profile, a subset of content items for presentation via the second email interface associated with the companion email account, wherein the selecting the subset of content items comprises selecting a first content item based upon a determination that the location is within an area associated with the first content item; and
displaying the first content item of the subset of content items via the second email interface associated with the companion email account.

2. The method of claim 1, comprising:
in response to selecting the subset of content items, transmitting a first email to the companion email account, wherein:
the first email comprises the first content item of the subset of content items; and
the displaying the first content item is performed in response to receiving a request to display the first email.

3. The method of claim 2, comprising:
displaying, via the second email interface associated with the companion email account, a list of email items comprising a first email item associated with the first email, wherein the request to display the first email is received in response to a selection of the first email item associated with the first email.

4. The method of claim 1, wherein:
the area corresponds to a geographical region of a property associated with the first content item.

5. The method of claim 1, wherein:
the activity associated with the companion email account comprises one or more searches performed using the second email interface associated with the companion email account; and
the content targeting profile comprises one or more search queries of the one or more searches.

6. The method of claim 1, comprising:
receiving, via the email client application, a request to deactivate the companion email account; and
in response to receiving the request to deactivate the companion email account, deactivating the companion email account.

7. The method of claim 1, wherein:
the generating the companion email account is performed in response to receiving an indication that the user accepts one or more conditions associated with the companion email account.

8. The method of claim 1, wherein:
a service status of the primary email account changes from a first status to a second status in association with the generating the companion email account;
the method comprises:
when the service status of the primary email account is the first status, providing a first set of services for the primary email account; and
when the service status of the primary email account is the second status, providing a second set of services for the primary email account; and the second set of services is different than the first set of services.

9. The method of claim 8, wherein:
the providing the second set of services comprises providing one or more email categorization services; and
the first set of services does not comprise the one or more email categorization services.

10. The method of claim 9, wherein:
the providing the one or more email categorization services comprises:
receiving a first email addressed to an email address of the primary email account;
analyzing the first email to determine a first category of the first email;
including the first email in a first group of emails associated with the first category;
receiving a second email addressed to the email address of the primary email account;
analyzing the second email to determine a second category of the second email; and
including the second email in a second group of emails associated with the second category.

11. The method of claim 10, wherein:
the providing the one or more email categorization services comprises:
displaying, via the first email interface associated with the primary email account, a first selectable input and a second selectable input, wherein:
the first selectable input is associated with a first list of email items associated with the first group of emails associated with the first category; and
the second selectable input is associated with a second list of email items associated with the second group of emails associated with the second category.

12. The method of claim 11, comprising at least one of:
displaying the first list of email items in response to a selection of the first selectable input; or
displaying the second list of email items in response to a selection of the second selectable input.

13. The method of claim 1, wherein:
the generating the companion email account is performed using Dynamic Client Registration (DCR) protocol.

14. A computing device comprising:
a processor; and
memory comprising processor-executable instructions that when executed by the processor cause performance of operations, the operations comprising:
upon installation of a client application on a client device, generating a companion user account without a user of the client device specifying a username of the companion user account, wherein the companion user account is different than a primary user account of the user;
displaying, via the client application, a first interface that provides access to resources associated with the primary user account;
displaying, via the client application, a second interface that provides access to resources associated with the companion user account;
generating a content targeting profile associated with the companion user account based upon at least one of:
activity associated with the companion user account, wherein the activity associated with the companion user account comprises one or more searches performed using the second interface associated with the companion user account, wherein the content targeting profile comprises one or more search queries of the one or more searches; or one or more interests selected by the user;

receiving, from a plurality of entities, a plurality of content items;

selecting, from among the plurality of content items and based upon the content targeting profile, a subset of content items for presentation via the second interface associated with the companion user account; and displaying a first content item of the subset of content items via the second interface associated with the companion user account.

15. The computing device of claim 14, wherein:

the content targeting profile is indicative of a location of the client device; and the selecting the subset of content items comprises selecting the first content item based upon a determination that the location is within an area associated with the first content item.

16. The computing device of claim 14, wherein:

the generating the companion user account is performed using Dynamic Client Registration (DCR) protocol.

17. The computing device of claim 14, the operations comprising:

receiving, via the client application, a request to deactivate the companion user account; and in response to receiving the request to deactivate the companion user account, deactivating the companion user account.

18. The computing device of claim 14, wherein:

the generating the companion user account is performed in response to receiving an indication that the user accepts one or more conditions associated with the companion user account.

19. The computing device of claim 14, wherein:

a service status of the primary user account changes from a first status to a second status in association with the generating the companion user account;

the operations comprise:

when the service status of the primary user account is the first status, providing a first set of services for the primary user account; and when the service status of the primary user account is the second status, providing a second set of services for the primary user account; and the second set of services is different than the first set of services.

20. A non-transitory machine readable medium having stored thereon processor-executable instructions that when executed cause performance of operations, the operations comprising:

generating a companion email account without a user specifying an email address of the companion email account, wherein the companion email account is different than a primary email account of the user, wherein a service status of the primary email account changes from a first status to a second status in association with the generating the companion email account;

when the service status of the primary email account is the first status, providing a first set of services for the primary email account;

when the service status of the primary email account is the second status, providing a second set of services for the primary email account, wherein the second set of services is different than the first set of services;

displaying, via an email client application, a first email interface that provides access to resources associated with the primary email account;

displaying, via the email client application, a second email interface that provides access to resources associated with the companion email account;

generating a content targeting profile associated with the companion email account based upon at least one of:

activity associated with the companion email account; or one or more interests selected by the user;

selecting, from among a plurality of content items and based upon the content targeting profile, a subset of content items for presentation via the second email interface associated with the companion email account; and displaying a first content item of the subset of content items via the second email interface associated with the companion email account.

* * * * *